(12) United States Patent
Ogawa

(10) Patent No.: US 9,964,562 B2
(45) Date of Patent: May 8, 2018

(54) CAPACITANCE TYPE PHYSICAL QUANTITY SENSOR

(71) Applicant: DENSO CORPORATION, Kariya, Aichi-pref. (JP)

(72) Inventor: Akira Ogawa, Ichinomiya (JP)

(73) Assignee: DENSO CORPORATION, Kariya (JP)

( * ) Notice: Subject to any disclaimer, the term of this patent is extended or adjusted under 35 U.S.C. 154(b) by 404 days.

(21) Appl. No.: 14/405,177

(22) PCT Filed: Jun. 6, 2013

(86) PCT No.: PCT/JP2013/003546
§ 371 (c)(1),
(2) Date: Dec. 3, 2014

(87) PCT Pub. No.: WO2013/187018
PCT Pub. Date: Dec. 19, 2013

(65) Prior Publication Data
US 2015/0143906 A1    May 28, 2015

(30) Foreign Application Priority Data

Jun. 13, 2012 (JP) .................................. 2012-134224
May 15, 2013 (JP) .................................. 2013-103188

(51) Int. Cl.
*G01P 15/135* (2006.01)
*G01P 15/13* (2006.01)
(Continued)

(52) U.S. Cl.
CPC ........ *G01P 15/135* (2013.01); *G01C 19/5747* (2013.01); *G01P 15/0802* (2013.01);
(Continued)

(58) Field of Classification Search
CPC .............................. G01P 15/13; G01P 15/135
(Continued)

(56) References Cited

U.S. PATENT DOCUMENTS 6,201,284 B1    3/2001  Hirata et al.
6,257,059 B1 *  7/2001  Weinberg ........... G01C 19/5719
                                                        73/504.16
(Continued)

FOREIGN PATENT DOCUMENTS

CN    201852851 U    6/2011
JP    06-160419 A    6/1994
(Continued)

OTHER PUBLICATIONS

International Search Report and Written Opinion of the International Searching Authority dated Jul. 16, 2013 for the corresponding international application No. PCT/JP2013/003546 (and English translation).

(Continued)

*Primary Examiner* — David M Gray
*Assistant Examiner* — Andrew V Do
(74) *Attorney, Agent, or Firm* — POSZ Law Group, PLC

(57) ABSTRACT

A capacitance type physical quantity sensor including a movable electrode formed in a weight part, and a fixed electrode facing the movable electrode is provided. A first movable sensing electrode and a first fixed sensing electrode face each other in a first y direction. A second movable sensing electrode and a second fixed sensing electrode face each other in a second y direction. A first movable damping electrode is located in the middle between two first fixed damping electrodes, faces one of the first fixed damping electrodes in the first y direction and faces the other of the first fixed damping electrodes in the second y direction. A plurality of the first movable damping electrodes are located point-symmetrically with respect to the center of the weight part or line-symmetrically with respect to a center line passing the center in the y direction.

11 Claims, 15 Drawing Sheets

(51) Int. Cl.
  *G01P 15/125* (2006.01)
  *G01P 15/08* (2006.01)
  *G01P 15/18* (2013.01)
  *G01C 19/5747* (2012.01)

(52) U.S. Cl.
  CPC ............ *G01P 15/125* (2013.01); *G01P 15/13* (2013.01); *G01P 15/18* (2013.01); *G01P 2015/0882* (2013.01)

(58) Field of Classification Search
  USPC .................. 73/1.37, 1.38, 1.77, 503.3, 504.2
  See application file for complete search history.

(56) References Cited

U.S. PATENT DOCUMENTS

| | | |
|---|---|---|
| 2002/0035873 A1* | 3/2002 | Sakai .................... B81B 3/0051 73/649 |
| 2002/0051258 A1 | 5/2002 | Tamura |
| 2002/0180462 A1 | 12/2002 | Hartwell et al. |
| 2003/0217597 A1 | 11/2003 | Kumagai et al. |
| 2004/0182157 A1 | 9/2004 | Sakai et al. |
| 2006/0197173 A1 | 9/2006 | Mase |
| 2007/0272015 A1* | 11/2007 | Kazama ............. G01C 19/5712 73/504.08 |
| 2009/0183568 A1 | 7/2009 | Yamanaka et al. |
| 2011/0083506 A1 | 4/2011 | Classen et al. |
| 2011/0147859 A1 | 6/2011 | Tanaka et al. |
| 2013/0256813 A1* | 10/2013 | Maruyama ............. H01L 24/09 257/414 |

FOREIGN PATENT DOCUMENTS

| | | |
|---|---|---|
| JP | 7-005192 A | 1/1995 |
| JP | 9-089927 A | 4/1997 |
| JP | 2009-047649 A | 3/2009 |
| JP | 2010-203990 A | 9/2010 |
| JP | 2010-230441 A | 10/2010 |
| JP | 2011-058819 A | 3/2011 |
| JP | 2011-163967 A | 8/2011 |

OTHER PUBLICATIONS

Examination Report dated Oct. 28, 2014 in the corresponding JP Application No. 2013-103188 (and English translation).
Office Action dated Dec. 8, 2015 in the corresponding CN application No. 201380031033.6 (with English translation).

* cited by examiner

CAPACITANCE TYPE PHYSICAL QUANTITY SENSOR

CROSS-REFERENCE TO RELATED APPLICATIONS

This application is a U.S. national stage application of PCT/JP2013/003546 filed on Jun. 6, 2013 and is based on Japan patent applications No. 2012-134224 filed on Jun. 13, 2012 and No. 2013-103188 filed on May 15, 2013, the contents of which are incorporated herein by reference.

TECHNICAL FIELD

The present disclosure relates to a capacitive physical quantity sensor including a substrate, an anchor fixed to a surface of the substrate, a detection beam connected to the substrate through the anchor, a weight connected to the detection beam, a movable electrode formed in the weight, and a fixed electrode opposed to the movable electrode.

BACKGROUND ART

As described in Patent Literature 1 for example, there has been conventionally proposed a semiconductor acceleration sensor including a movable electrode formed in a weight, a fixed electrode opposed to the movable electrode, a first beam connected to the weight and movable in accordance with acceleration, a first stopper regulating a displacement amount of the first beam, and a second beam supporting the first stopper. The first beam includes multiple beam portions having different spring constants. A displacement amount of each beam portion is regulated by a corresponding stopper. A stopper and an adjacent beam portion are connected. The movable electrode and the fixed electrode form a capacitor. This structure reduces degradation of a capacitance linearity of the capacitor when the application of acceleration largely displaces the movable electrode.

PRIOR ART LITERATURES

Patent Literature

Patent Literature 1; JP 2004-286615A (corresponding to US2004/0182157A)

SUMMARY OF INVENTION

As described above, in the semiconductor acceleration sensor in Patent Literature 1, the displacement amount of the first beam is regulated by the first stopper. Thus, even in application of a large impact at rear-end collision etc., a resultant acceleration is detectable. However, the first beam is configured such that the first beam includes multiple beam portions having different spring constants, a displacement amount of each beam portion is regulated by a corresponding stopper, and a stopper and an adjacent beam portion are connected. In this case, at a time of the above-described application of a strong impact, the weight formed in the movable electrode may rotate and posture of the weight may change. When the posture of the weight changes, an opposing area between the movable electrode and the fixed electrode may change and the acceleration detection accuracy may be reduced.

In view of the foregoing, it is an object of the present disclosure to provide a capacitive physical quantity sensor in which a reduction in physical quantity detection accuracy is suppressed by posture control.

To accomplish the above object, a capacitive physical quantity sensor of one example of the present disclosure comprises a substrate having one surface along a x-y plane, which is defined by a x direction and a y direction perpendicular to each other, an anchor fixed to the one surface of the substrate, a detection beam connected to the substrate through the anchor, a weight connected to the detection beam, a movable electrode formed in the weight, and a fixed electrode opposed to the movable electrode on the x-y plane. The detection beam has flexibility in the y direction. The movable electrode includes a first movable detection electrode, a second movable detection electrode and a first movable damping electrode. The fixed electrode includes a first fixed detection electrode, a second fixed detection electrode and a first fixed damping electrode. The first fixed detection electrode is located separately from the first movable detection electrode in a first y direction and is opposed to the first movable detection electrode in the first y direction, the first y direction being one direction in the y direction. The second fixed detection electrode is located separately from the second movable detection electrode in a second y direction and is opposed to the second movable detection electrode in the second y direction, the second y direction and the first y direction are opposite directions. The first movable damping electrode is located at a center between corresponding two of the first fixed damping electrodes and is opposed to one of the corresponding two of the first fixed damping electrodes in the first y direction and is opposed to the other of the corresponding two of the first fixed damping electrodes in the second y direction. A plurality of the first movable damping electrodes are located point-symmetrically with respect to the center of the weight, or line-symmetrically with respect to a center line, which passes through the center of the weight in the y direction.

According to this capacitive physical quantity sensor, when an acceleration is applied in the y-direction, an excessive displacement of the weight in the y-direction is suppressed by damping between the first movable damping electrode and the first fixed damping electrode. Therefore, even at a time of strong shock application such as a rear-end collision etc., a resultant physical quantity such as acceleration or the like is detectable. Moreover, in the above capacitive physical quantity sensor, the plurality of the first movable damping electrodes are located point-symmetrically with respect to the center of the weight, or line-symmetrically with respect to a center line, which passes through the center of the weight in the y direction. Thus, at the time of strong shock, rotation of the weight on the x-y plane is suppressed, and the posture of the weight is controlled. This suppresses displacement of the weight in the x direction and suppresses a change in opposing surface between the detection electrodes. As a result, reduction in acceleration detection accuracy is suppressed. It is noted that in the present disclosure, recitation of the point-symmetry or point-symmetry includes the point-symmetry and point-symmetry and does not exclude satisfaction of both.

A capacitive physical quantity sensor of another example of the present disclosure comprises a substrate having one surface along a x-y plane defined by a x direction and a y direction perpendicular to each other, an anchor fixed to the one surface of the substrate, a detection beam connected to the substrate through the anchor, a weight connected to the detection beam, a movable electrode formed in the weight, and a fixed electrode opposed to the movable electrode in a z-direction, which is perpendicular to the x-y plane. The detection beam has flexibility in the z-direction. The movable electrode includes a first movable detection electrode, a second movable detection electrode and a first movable damping electrode. The fixed electrode includes a first fixed detection electrode, a second fixed detection electrode and a first fixed damping electrode. The first fixed detection electrode is located apart from the first movable detection electrode in a first z-direction being one direction in the z-direction and is opposed to the first movable detection electrode in the first z-direction. The second fixed detection electrode is located apart from the second movable detection electrode in a second z-direction being opposite to the first z-direction and is opposed to the second movable detection electrode in the second z-direction. Each of a plurality of the first movable damping electrodes is located at a center between corresponding two of the first fixed damping electrodes, is opposed to one of the corresponding two of the first fixed damping electrodes in the first z direction, and is opposed to the other of the corresponding two of the first fixed damping electrodes in the second z direction. The plurality of the first movable damping electrodes are located point-symmetrically with respect to a center of the weight, or line-symmetrically with respect to a center line, which pass through the center of the weight in the z-direction.

According to this capacitive physical quantity sensor, when an acceleration is applied in the z-direction, an excessive displacement of the weight in the y-direction is suppressed by damping between the first damping electrodes. Therefore, even at the time of strong shock such as a rear-end accident, the resultant acceleration is detectable. Moreover, the plurality of the first movable damping electrodes are located point-symmetrically with respect to the center of the weight, or line-symmetrically with respect to the center line. Thus, at the time of strong shock, rotation of the weight on the z-x plane is suppressed, and the posture of the weight is controlled and a change in opposing surface between the detection electrodes is suppressed. As a result, reduction in acceleration detection accuracy is suppressed.

BRIEF DESCRIPTION OF DRAWINGS

The above and other objects, features, and advantages of the disclosure will be more apparent from the following detailed description with reference to the accompanying drawings in which.

EMBODIMENTS FOR CARRYING OUT INVENTION

Based on the drawings, explanation will be given on an acceleration sensor as an embodiment of a capacitive physical quantity sensor concerning the present disclosure First Embodiment Based on FIG. 1 and FIG. 2, the acceleration sensor of the present embodiment will be explained. For clarification of structures, hatchings are provided to FIG. 1 and FIG. 2 on an as-needed basis. In the followings, two directions perpendicular to each other are denoted by an x direction and a y direction. The plane defined by these two directions is denoted by an x-y plane. As shown by the dashed line in FIG. 1, a center line CL along the y direction passes through a center of the acceleration sensor 100 (center CP of weight 17).

Figure 1:
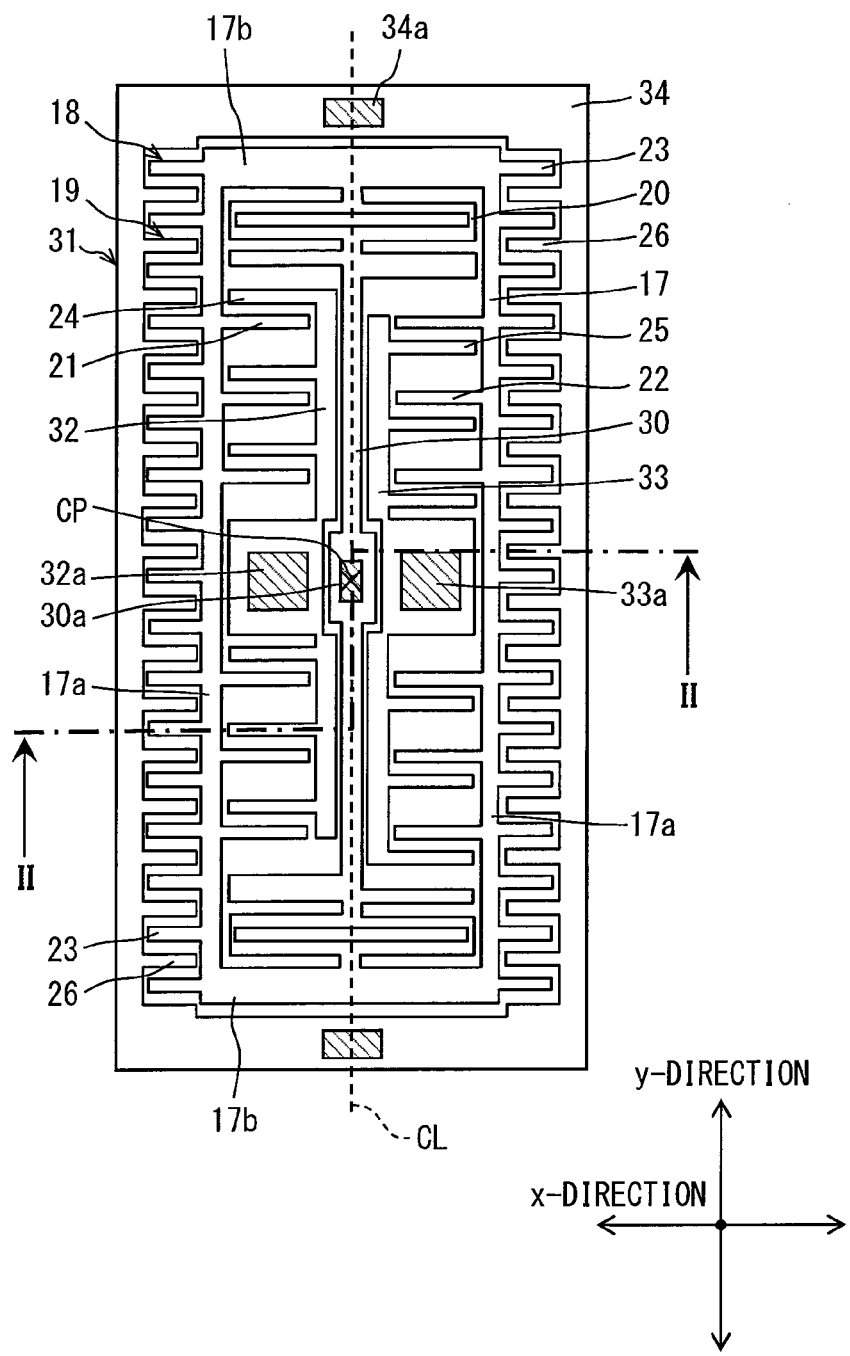
FIG. 1 is a top view illustrating an outline configuration of an acceleration sensor of a first embodiment.
Figure 2:
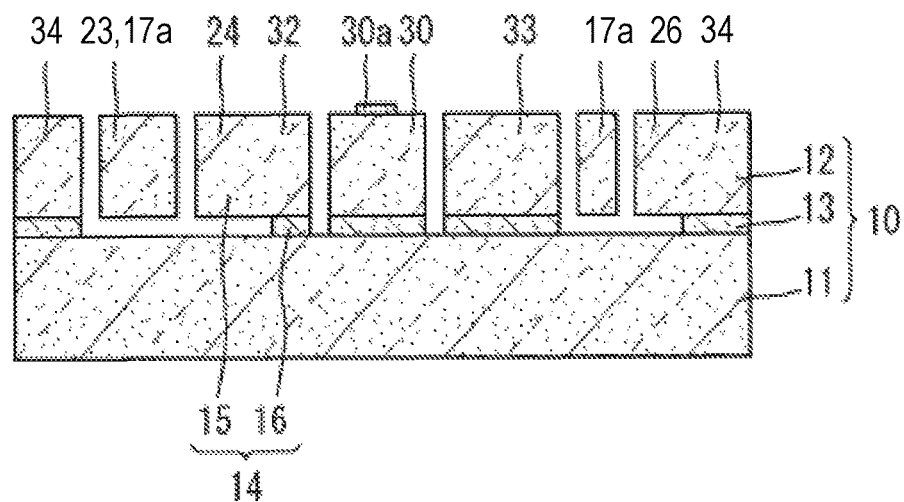
FIG. 2 is sectional view taken along line II-II line of FIG. 1 to detect acceleration in a y direction.

As shown in FIG. 1 and FIG. 2, the acceleration sensor 100 includes a semiconductor substrate 10 formed with a fine structure. The semiconductor substrate 10 is a SOI substrate, in which an insulating layer 13 is sandwiched between two semiconductor layers 11 and 12. The semiconductor substrate 10 is formed with a sensor element 14 corresponding to the above-mentioned fine structure. The first semiconductor layer 11 corresponds to an example of substrate.

The sensor element 14 is formed by etching the second semiconductor layer 12 and the insulating layer 13 into a predetermined shape using well-known exposure technology. The sensor element 14 includes a floating part 15 and a fixed part 16. In the floating part 15, the second semiconductor layer 12 is floated with respect to the first semiconductor layer 11 not through the insulating layer 13. In the fixed part 16, the second semiconductor layer 12 is fixed to the first semiconductor layer 11 through the insulating layer 13.

The floating part 15 includes a weight 17 constituting a center of mass, a movable electrode 18 formed in the weight 17, a fixed electrode 19 opposed to the movable electrode 18, a detection beam 20 having a spring characteristic in the y direction. The fixed part 16 includes a first anchor 30 supporting the weight 17 through the detection beam 20, and a second anchor 31 supporting the fixed electrode 19. The second anchor 31 includes a third anchor 32 supporting the below-described first fixed detection electrode 24, a fourth anchor 33 supporting the below-described second fixed detection electrode 25, and a fifth anchor 34 supporting the below-described first fixed damping electrode 26.

As shown in FIG. 1, the weight 17 includes two first stick portions 17a along a y direction, and two second stick portions 17b along the x direction, and has a frame shape in which ends of the portions are connected. The detection beam 20 is connected to inner surfaces of the two second stick portions 17b of the weight 17. Each detection beam 20 is connected to an end of the first anchor 30 shaped to extend in the y direction. This structure allows the weight 17 to be displaced in the y direction. When the acceleration in the y direction is applied to the acceleration sensor 100, the weight 17 is displaced according to magnitude of the applied acceleration. Its displacement amount is converted into a capacitance of the later-described detection capacitor. This capacitance is outputted to an external device as an acceleration detection signal.

The movable electrode 18 includes a first movable detection electrode 21, a second movable detection electrode 22, and a first movable damping electrode 23. As shown FIG. 1, an inner surface of one of the first stick portions 17a of the weight 17 is formed with the first movable detection electrode 21, which has a comb shape and which has a longitudinal direction in the x direction. An inner surface of the other of the first stick portions 17a is formed with the second movable detection electrode 22, which has a comb shape and which has a longitudinal direction in the x direction. Outer surfaces of the two first stick portions 17a are formed with the first movable damping electrodes 23 each having a comb shape and having a longitudinal direction in the x direction. The multiple first movable damping electrodes 23 are located point-symmetrically with respect to the center CP of the weight 17, and also located line-symmetrically with respect to the center line CL in the present embodiment.

The fixed electrode 19 includes a first fixed detection electrode 24, a second fixed detection electrode 25, and a first fixed damping electrode 26. As shown in FIG. 1, the third anchor 32 shaped to extend in the y direction has an opposing surface that is opposed to one of the first stick portions 17a. The opposing surface of the third anchor 32 is formed with the first fixed detection electrode 24, which has a comb shape and which has a longitudinal direction in the x direction. The fourth anchor 33 shaped to extend in the y direction has an opposing surface that is opposed to the other of the first stick portions 17a. The opposing surface of the fourth anchor 33 is formed with the second fixed detection electrode 25, which has a comb shape and which has a longitudinal direction in the x direction. The fifth anchor 34 having a frame shape has an opposing surface that is opposed to the first stick portion 17a. The opposing surface of the fifth anchor 34 is formed with the first fixed damping electrode 26, which has a comb shape and which has a longitudinal direction in the x direction.

As shown in FIG. 1, the first fixed detection electrode 24 is located separately from the corresponding first movable detection electrode 21 in a first y direction (direction from a lower side to an upper side of the drawing sheet). The first y direction is one direction in the y direction. The second fixed detection electrode 25 is located separately from the corresponding second movable detection electrode 22 in a second y direction (direction from an upper side to a lower side of the drawing sheet). The second y direction and the first y direction are opposite directions. The comb-shaped first detection electrodes 21 and 24 project and recess with respect to each other so as to be opposed to each other in the first y direction, and thereby form multiple first detection capacitors. The comb-shaped second detection electrodes 22 and 25 project and recess with respect to each other so as to be opposed to each other in the second y direction, and thereby form multiple second detection capacitors. The first movable damping electrode 23 is located at the center between the two first fixed damping electrodes 26, and is opposed to one of the two first fixed damping electrodes 26 in the first y direction, and is opposed to the other of the two first fixed damping electrodes 26 in the second y direction. The first movable damping electrode 23 and the first fixed damping electrode 26 are geometrically similar. An opposing interval between the first movable damping electrode 23 and the first fixed damping electrode 26 is constant.

As described above, the first detection electrodes 21 and 24 are opposed to each other in the first y direction. The second detection electrodes 22 and 25 are opposed to each other in the second y direction. Therefore, when the weight 17 moves in the first y direction, the first detection electrodes 21 and 24 are displaced to approach each other, and the second detection electrodes 22 and 25 are displaced to depart from each other. When the weight 17 moves in the second y direction, the first detection electrodes 21 and 24 are displaced to depart from each other and the second detection electrodes 22 and 25 are displaced to approach each other. In this way, the first detection capacitor and the second detection are opposite in respect of increase and decrease in capacitance. Based on a difference between capacitances of these two detection capacitors, the acceleration in the y direction is detected.

As described above, the first anchor 30 is shaped to extend in the y direction, and its opposite ends are connected to the detection beam 20. Each anchor 32, 33 is shaped to extend in the y direction, its side surface is formed with the fixed detection electrodes 24, 25. The fifth anchor 34 has a frame shape, an inner surface of which is formed with the first fixed damping electrode 26.

A movable detection pad 30a for applying a constant voltage is formed at the center of the first anchor 30. A first fixed detection pad 32a for taking out a capacitance change of the first detection capacitor is formed at the center of the third anchor 32. A second fixed detection pad 33a for taking out the capacitance changes of the second detection capacitor is formed at the center of the fourth anchor 33. A damping pad 34*a* for applying a diagnostic voltage different in polarity from the voltage applied to the movable detection pad 30*a* is formed in the fifth anchor 34.

The acceleration sensor 100 of the present embodiment performs a normal operation which detects acceleration, and a failure-diagnosis operation which diagnoses a failure thereof.

In the normal operation, the constant voltage is applied to the movable detection pad 30*a*. The capacitance change resulting from the application of the acceleration is outputted from each of the fixed detection pads 32*a* and 33*a*. The damping pad 34*a* is connected to ground in order to maintain the electric potential of the acceleration sensor 100.

In the failure diagnosis, first, the voltages having different polarities are applied to the respective fixed detection pads 32*a* and 33*a* for a predetermined time. An electrostatic force generated in the detection electrodes 21, 22, 24, and 25 due to this voltage application displaces the weight 17 in the y direction. Thereafter, the voltage application to the fixed detection pads 32*a* and 33*a* are stopped and a diagnostic voltage is applied to the damping pad 34*a*. An electrostatic force generated in the first damping electrodes 23, 26 due to this voltage application further displaces the weight 17 in the y direction. The capacitance changes of the detection capacitor generated due to this electrostatic force is taken out from each fixed detection pads 32*a*, 33*a*. By determining whether or not these taken-out capacitance changes match expected values, the presence and absence of failure of the acceleration sensor 100 is determined.

Next, technical effects of the acceleration sensor 100 concerning the present embodiment will be explained. As described above, the first movable damping electrodes 23 are formed in the weight 17 and located point-symmetrically with respect to the center CP of the weight 17. The first movable damping electrode 23 is located at a center between the two first fixed damping electrodes 26. The first movable damping electrode 23 is opposed to one first fixed damping electrode 26 in the first y direction, and is opposed to the other first fixed damping electrode 26 in the second y direction. This suppresses excessive displacement of the weight 17 in the y direction because of the damping generated between the first damping electrodes 23 and 26 when the acceleration is applied in the y direction. Therefore, even at the time of strong shock, the resultant acceleration is detectable. Moreover, the multiple first movable damping electrodes 23 are located point-symmetrically with respect to the center CP of the weight 17. Therefore, at the time of strong shock, the rotation of the weight 17 on the x-y plane is suppressed and the posture of the weight 17 is controlled. This suppresses displacement of the weight 17 in the x direction and suppresses a change in opposing surface between the first detection electrodes 21, 24 and second detection electrodes 22, 25. As a result, reduction in acceleration detection accuracy is suppressed. In addition, the multiple first movable damping electrodes 23 are located line-symmetrically with respect to the central line CL. Because of this also, the rotation of the weight 17 on the x-y plane is suppressed and the posture of the weight 17 is controlled. The reduction in acceleration detection accuracy is suppressed.

The first movable damping electrode 23 and the first fixed damping electrode 26 are geometrically similar. The opposed interval between the first movable damping electrode 23 and the first fixed damping electrode 26 is constant. This prevents a bias of damping generated between the first movable damping electrode 23 and the first fixed damping electrode 26, as compared with a structure in which the first movable damping electrode and the first fixed damping electrode are not geometrically similar and the opposed interval between the first movable damping electrode and the first fixed damping electrode is not constant. Therefore, as compared with the above structure, the rotation of the weight 17 on the x-y plane is suppressed and the posture of the weight 17 is controlled. As a result, the reduction in acceleration detection accuracy is suppressed.

As described above, in the failure diagnosis, by applying the diagnosis voltage to the damping pad 34*a* to displace the weight 17 in the y direction, the presence and absence of failure of the acceleration sensor 100 is determined. By using the first damping electrodes 23 and 26 and the damping pad 34*a* in this way, the self-diagnosis of the failure of the acceleration sensor 100 can be carried out The embodiment of the present disclosure has been illustrated above, embodiments of the present disclosure are not limited to the above-illustrated embodiments and include embodiments modified in various ways without departing from the scope of the present disclosure.

Figure 3:
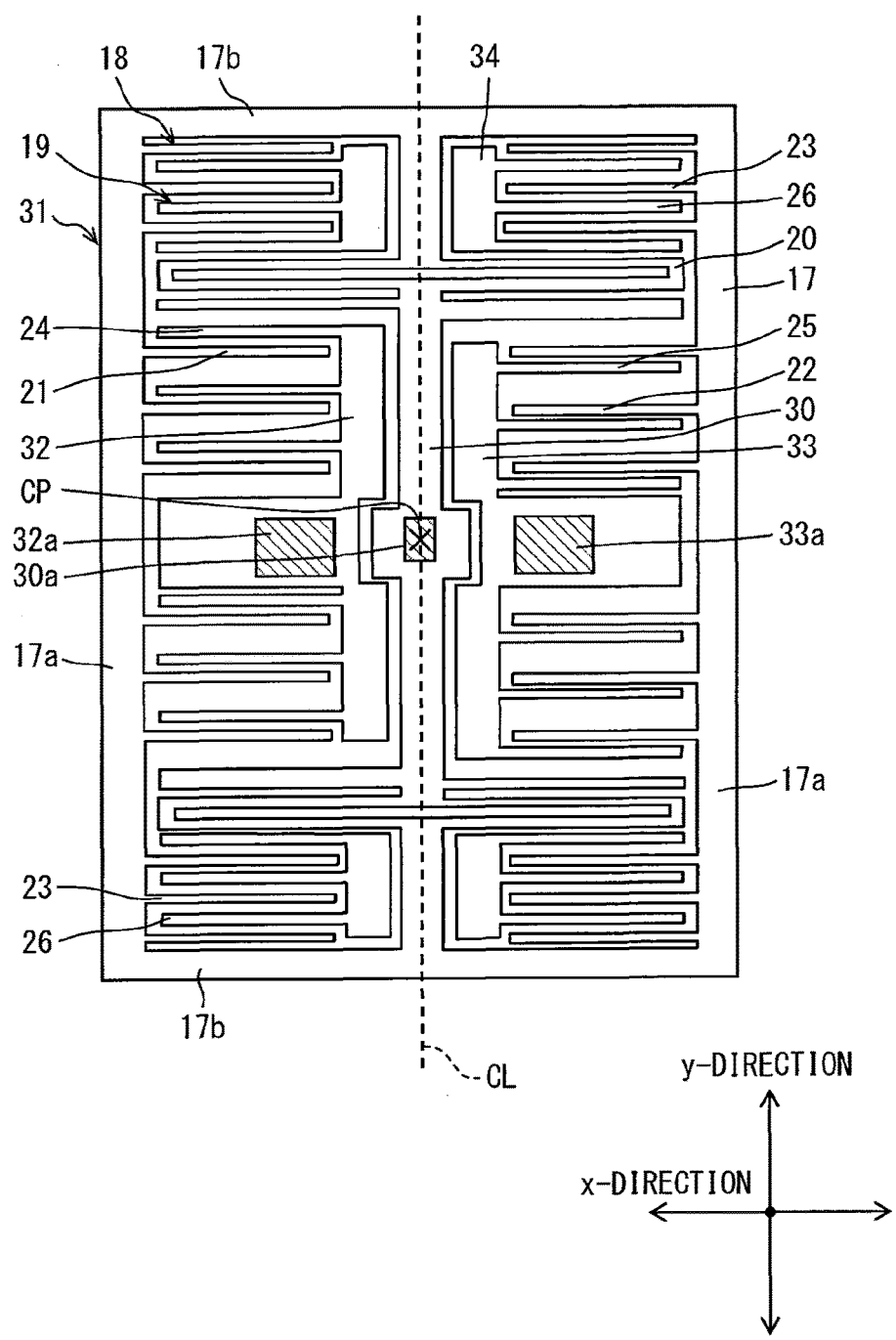
FIG. 3 is a top view illustrating an acceleration sensor of one modification.

In an example of the present embodiment, the first movable damping electrode 23 is formed in an outer surface of the first stick portion 17*a*, and the first fixed damping electrode 26 is formed in the fifth anchor 34 having the frame shape. However, as shown in FIG. 3, the first movable damping electrode 23 is formed in an inner surface of the first stick portion 17*a*, and the first fixed damping electrode 26 is formed in a side surface of the fifth anchor 34 shaped to extend in the y direction.

Figure 4:
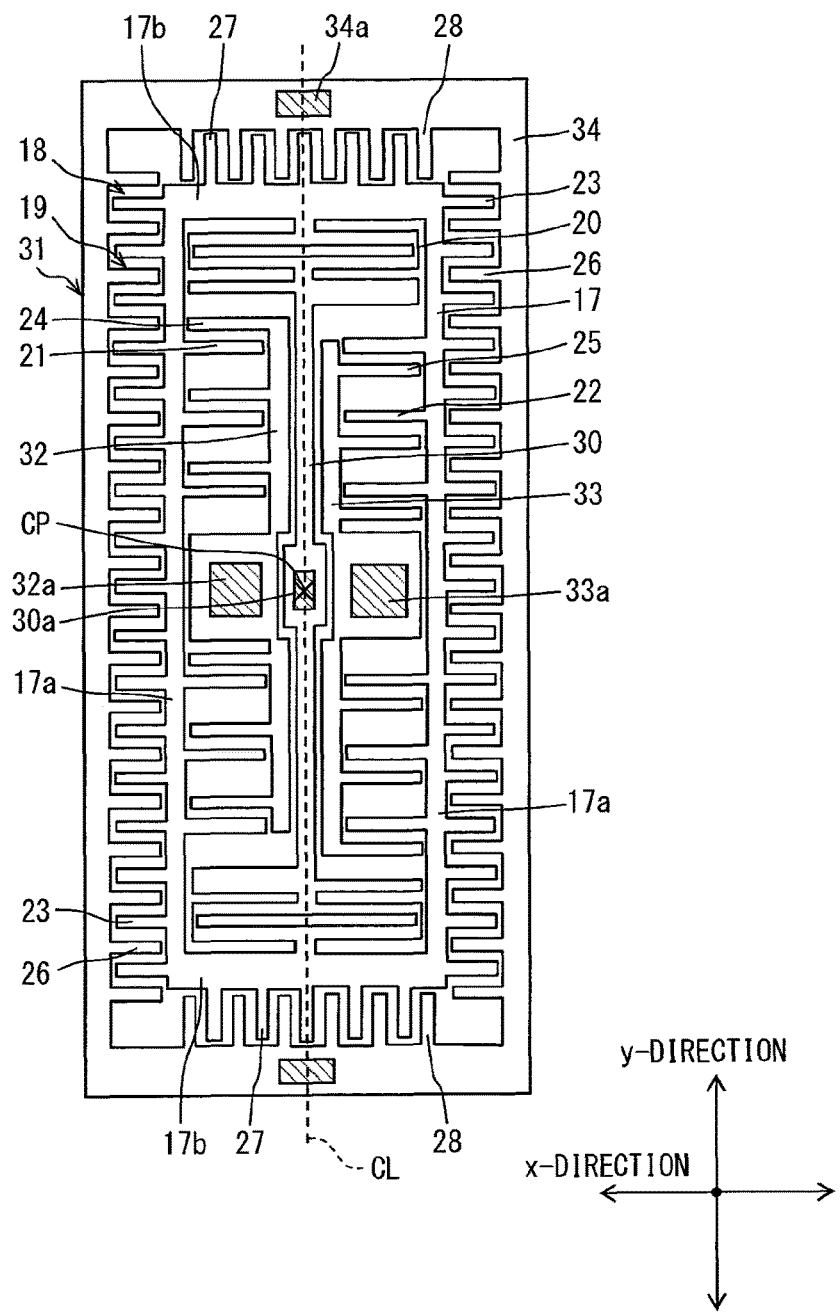
FIG. 4 is a top view illustrating an acceleration sensor of another modification.

In an example of the present embodiment, the first movable damping electrode 23 is formed in outer surface of the first stick portion 17*a*, and the first fixed damping electrode 26 is formed in the opposing surface of the frame-shaped fifth anchor 34 opposed to the first stick portion 17*a*. However, as shown in FIG. 4, in addition to the structure described in the present embodiment, the second movable damping electrode 27 is formed in an outer surface of the second stick portion 17*b*, and the second fixed damping electrode 28 is formed in the opposing surface of the frame-shaped fifth anchor 34 opposed to the second stick portion 17*b*. The second movable damping electrode 27 is located at the center between the two second fixed damping electrodes 28. The second movable damping electrode 27 is opposed to one second fixed damping electrode 28 in the first x direction (direction from left to right of the drawing sheet) and is opposed to the other second fixed damping electrode 28 in the second x direction (direction from right to left of the drawing sheet). The first x direction is one direction in the x direction is opposite to the second x direction. The multiple second movable damping electrode 27 are located point-symmetrically with respect to the center CP of the weight 17. According to this, the damping generated between the second movable damping electrode 27 and the second fixed damping electrode 28 suppresses the rotation of the weight 17 on the x-y plane and controls the posture of the weight 17 more effectively as compared with the structure described in the above embodiment. As a result, the reduction in acceleration detection accuracy is more effectively suppressed.

Figure 5:
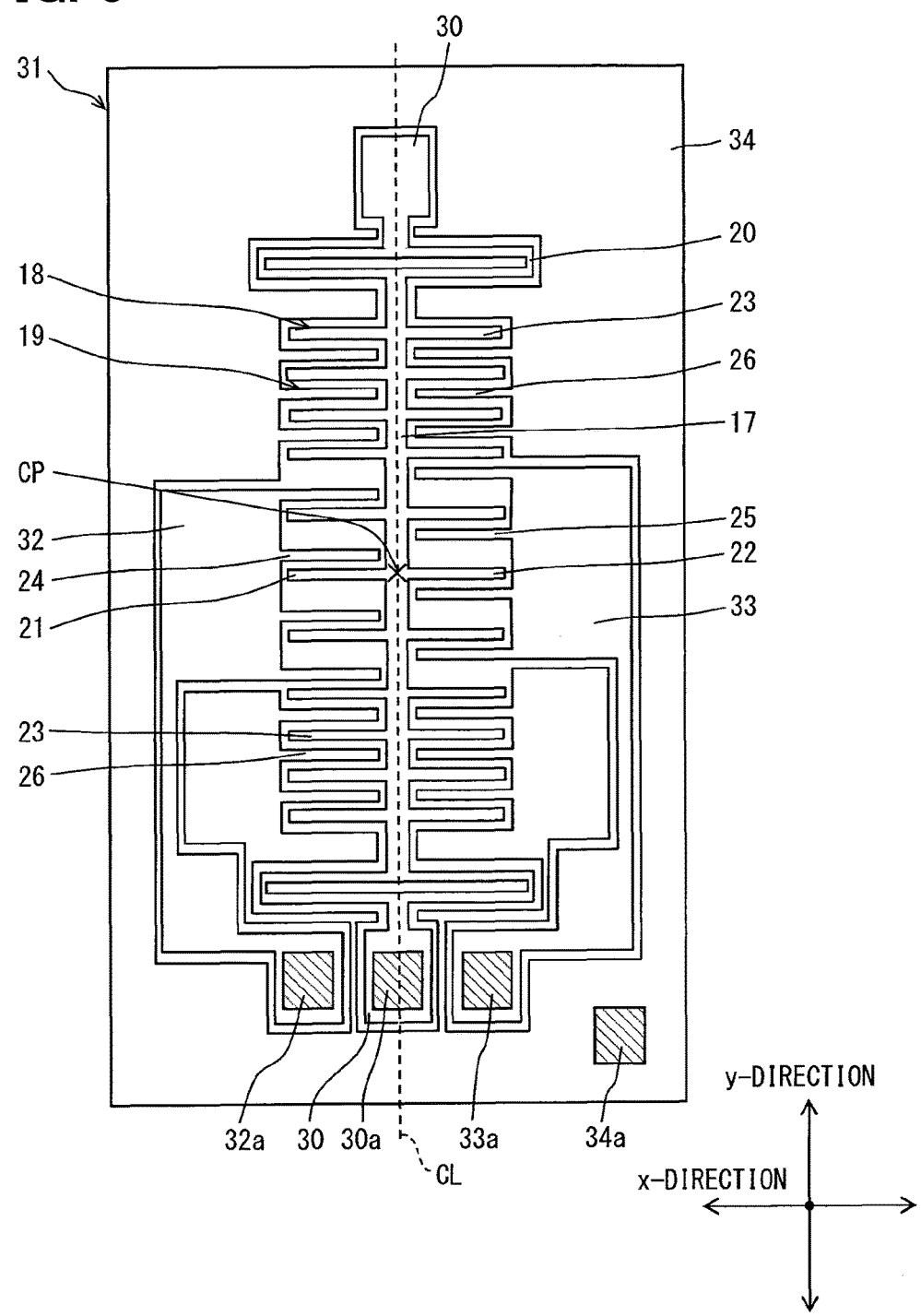
FIG. 5 is a top view illustrating an acceleration sensor of another modification.

In an example of the present embodiment, the weight 17 has the two first stick portions 17*a* along the y direction, and the two second stick portions 17*b* along the x direction, and these ends are connected to form the frame shape. However, as shown in FIG. 5, the weight 17 may have a shape that extends in the y direction. In the modification illustrated in FIG. 5, opposite ends of the weight 17 are connected to the first anchor 30 through the detection beam 20, and the movable electrodes 21 to 23 are formed in the side surface of the weight 17.

Figure 6:
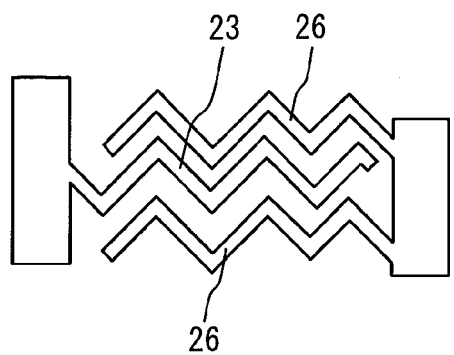
FIG. 6 is a top view illustrating a first movable damping electrode and a first fixed damping electrode of one modification.
Figure 7:
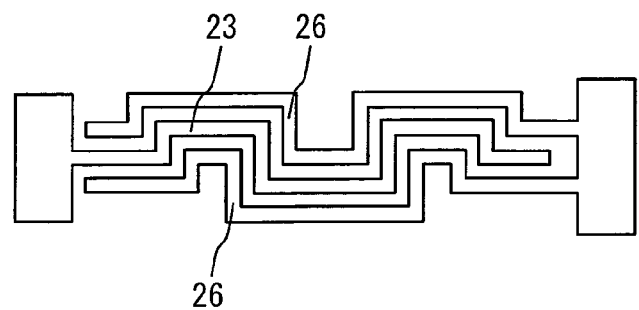
FIG. 7 is a top view illustrating a first movable damping electrode and a first fixed damping electrode of another modification.
Figure 8:
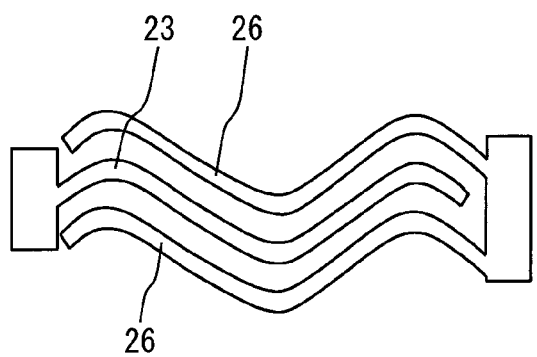
FIG. 8 is a top view illustrating a first movable damping electrode and a first fixed damping electrode of another modification.

In the present embodiment, as shown in FIG. 1, each of the first damping electrodes 23 and 26 has a rectangular shape as its planer shape. However, the first damping electrode 23, 26 may have any planer shapes as long as the first damping electrodes 23, 26 are geometrically similar and have a constant opposing interval therebetween. For this structure, a zigzag shape, a crank shape, a wavy shape can be adopted as the plane shape of each first damping electrode 23, 26, as shown in FIG. 6 to FIG. 8. According to these modifications, the opposing surface of each first damping electrode 23, 26 increases and the damping generated between the first movable damping electrode 23 and the first fixed damping electrode 26 strengthens, as compared with the structure illustrated in the embodiment where each first damping electrode has the rectangular shape as its planer shape. This further reduces the rotation of the weight 17 and more effectively controls the posture of the weight 17. As a result, the reduction in acceleration detection accuracy is more effectively suppressed.

In the present embodiment, an example structure of the acceleration sensor 100 for detecting the acceleration in the y direction is described. However, as shown in FIG. 9 to FIG. 28, an acceleration sensor 200 for detecting acceleration in the z-direction is also employable. In the following, the acceleration sensor 200 will be illustrated based on FIG. 9 to FIG. 28. In the drawings, for clarification of elements, elements may be shown by being surrounded by dashed-lines and one-dotted dashed lines.

A semiconductor substrate 110 of the acceleration sensor 200 includes five semiconductor layers 111 to 115, and insulating layers 116 to 119 provided between these semiconductor layers 111 to 115. The semiconductor layers 111, 115 correspond to the first semiconductor layer 11 illustrated in the present embodiment. The semiconductor layers 112 to 114 and the insulating layers 117, 118 correspond to the second semiconductor layer 12 illustrated in the present embodiment. The insulating layers 116, 119 correspond to the insulating layer 13 illustrated in the present embodiment.

Figure 9:
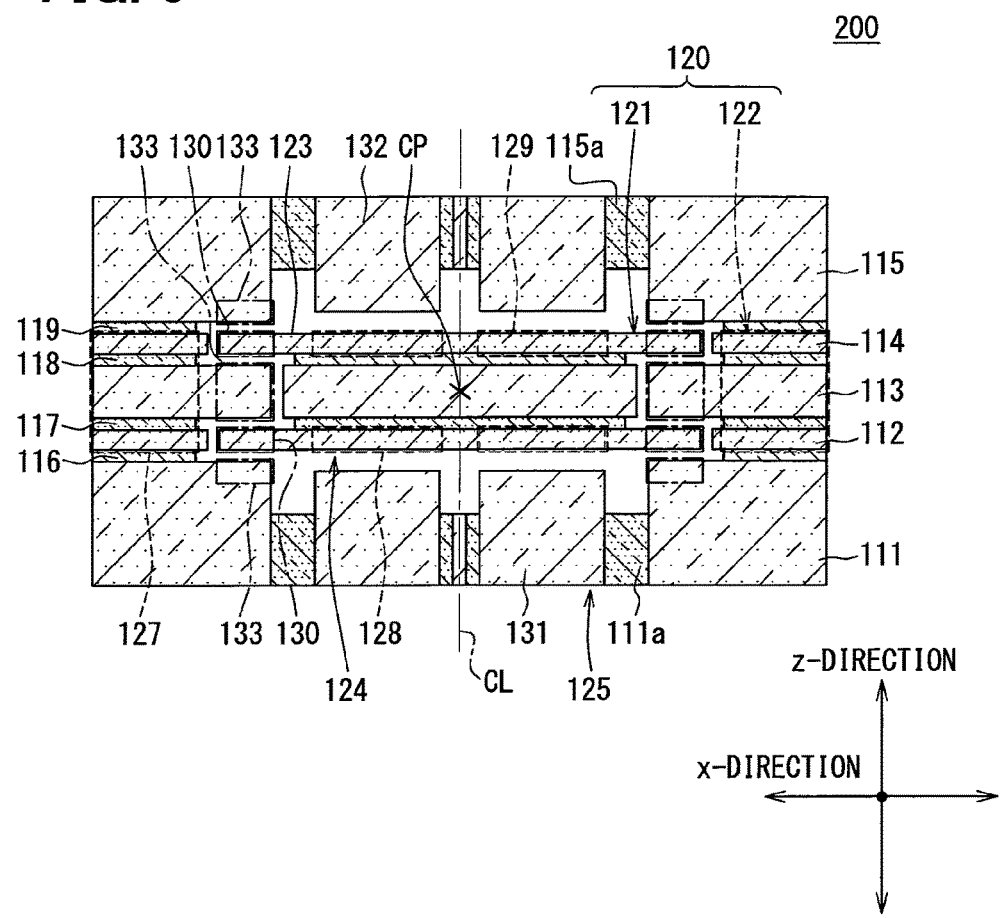
FIG. 9 is a sectional view illustrating an acceleration sensor for detecting acceleration in a z direction.

As shown in FIG. 9, the first insulating layer 116 is formed between the first semiconductor layer 111 and the second semiconductor layer 112. The second insulating layer 117 is formed between the second semiconductor layer 112 and the third semiconductor layer 113. The third insulating layer 118 is formed between the third semiconductor layer 113 and the fourth semiconductor layer 114. The fourth insulating layer 119 is formed between the fourth semiconductor layer 114 and the fifth semiconductor layer 115. The semiconductor layers 111, 115 have the same thickness. The semiconductor layers 112, 114 have the same thickness. The insulating layers 116 to 119 have the same thickness. Twos of the semiconductor layers 111 to 115 opposed to each other through one of the insulating layers 116 to 119 have the same distance therebetween.

The sensor element 120 is formed by etching the semiconductor substrate 110 into a predetermined shape using well-known exposure technology. The sensor element 120 includes a floating part 121 and a fixed part 122. In the floating part 121, the semiconductor layers 112 to 114 and the insulating layer 117, 118 are floated with respect to the semiconductor layer 111, 115 not through the insulating layer 116, 119. In the fixed part 122, the semiconductor layers 112 to 114 and the insulating layers 117, 118 are fixed to the semiconductor layers 111, 115 through the insulating layers 116, 119.

The floating part 121 includes a weight 123 providing a center of mass, a movable electrode 124 formed in the weight 123, a fixed electrode 125 opposed to the movable electrode 124 in the z-direction, and a detection beam 126 having flexibility in the z-direction. The fixed part 122 includes a first anchor 127 supporting the weight 123 through the detection beam 126. In addition, the fixed electrode 125 is formed in a part of each semiconductor layer 111, 115.

As shown in FIG. 9, in the weight 123, center parts of the semiconductor layers 112 to 114 are connected by the insulating layers 117, 118. Each part of the semiconductor layer 112, 114 constituting the weight 123 plays a role of the movable electrode 124. The third semiconductor layer 113 constituting the weight 123 is connected to the first anchor 127 through the detection beam 126. This structure allows the weight 123 to be displaced in the z-direction. When the acceleration in the z-direction is applied to the acceleration sensor 200, the weight 123 is displaced in the z-direction according to the magnitude of the applied acceleration. The displacement amount is converted into the electrostatic capacitance of the below-described detection capacitor. This converted electrostatic capacitance is outputted to an external device as an acceleration detection signal.

The movable electrode 124 includes a first movable detection electrode 128, a second movable detection electrode 129, and a first movable damping electrode 130. As shown by the dished line in FIG. 9, the first movable detection electrode 128 is constructed in the second semiconductor layer 112 constituting the weight 123. The second movable detection electrode 129 is constructed in the fourth semiconductor layer 114 constituting the weight 123. Moreover, as shown by the one-dotted dashed line in FIG. 9, the first movable damping electrode 130 is constructed in the second semiconductor layer 112 and the fourth semiconductor layer 114 constituting the weight 123. The multiple first movable damping electrodes 130 are located point-symmetrically with respect to the center CP of the weight 123. In the present embodiment, the multiple first movable damping electrodes 130 are located also line-symmetrically with respect to the central line CL which pierces through the center CP in the z-direction.

The fixed electrode 125 includes a first fixed detection electrode 131, a second fixed detection electrode 132, and a first fixed damping electrode 133. As shown in FIG. 9, parts of the first semiconductor layer 111 are separated and insulated by an insulating layer 111a. These parts are opposed to the first movable detection electrode 128 in the z-direction. The part opposed to the first movable detection electrode 128 in the z-direction corresponds to the first fixed detection electrode 131. Parts of the fifth semiconductor layer 115 are separated and insulated by an insulating layer 115a. These parts are opposed to the second movable detection electrode 129 in the z-direction. The part opposed to the second movable detection electrode 129 in the z-direction corresponds to the second fixed detection electrode 132. The detection electrodes 128, 129, 131, 132 constitute the detection capacitor. As shown in FIG. 9, an end of each semiconductor layer 111, 115 fixed to the first anchor 127 and a part of each end of the third semiconductor layer 113 are opposed to the first movable damping electrode 130 in the z-direction. These opposing parts correspond to the first fixed damping electrode 133. Out of the fixed electrodes 131-133, the first fixed damping electrode 133 being the end of the third semiconductor layer 113 is included in the floating part 121.

As shown in FIG. 9, the first fixed detection electrode 131 is located separately from the corresponding first movable detection electrode 128 in a first z-direction (a direction from an upper side to a lower side of the drawing sheet). The second fixed detection electrode 132 is located separately from the corresponding second movable detection electrode 129 in a second z-direction (direction from a lower side to an upper side of the drawing sheet). The first z-direction is one direction in the z-direction and is opposite to the second z-direction. The first detection electrode 128, 131 opposed to each other in the first z-direction constitutes a first detection capacitor. The second detection electrode 129, 132 opposed to each other in the second z-direction constitutes a second detection capacitor. The first movable damping electrode 130 is located at the center between the two first fixed damping electrodes 133 and is opposed to one first fixed damping electrode 133 in the first z-direction and is opposed to the other first fixed damping electrodes 133 in the second z-direction. Specifically, in the z-direction, the first movable damping electrode 130 provided by the second semiconductor layer 112 is located between the first fixed damping electrodes 133 provided by the first semiconductor layer 111 and the first fixed damping electrodes 133 provided by the third semiconductor layer 113. In the z-direction, the first movable damping electrode 130 provided by the fourth semiconductor layer 114 is located between the first fixed damping electrodes 133 provided by the third semiconductor layer 113 and the first fixed damping electrodes 133 provided by the fifth semiconductor layer 115. Thereby, even when the weight 123 is displaced in any of the first z-direction and the second z-direction, the damping arises between the damping electrodes 130, 133.

Figure 10:
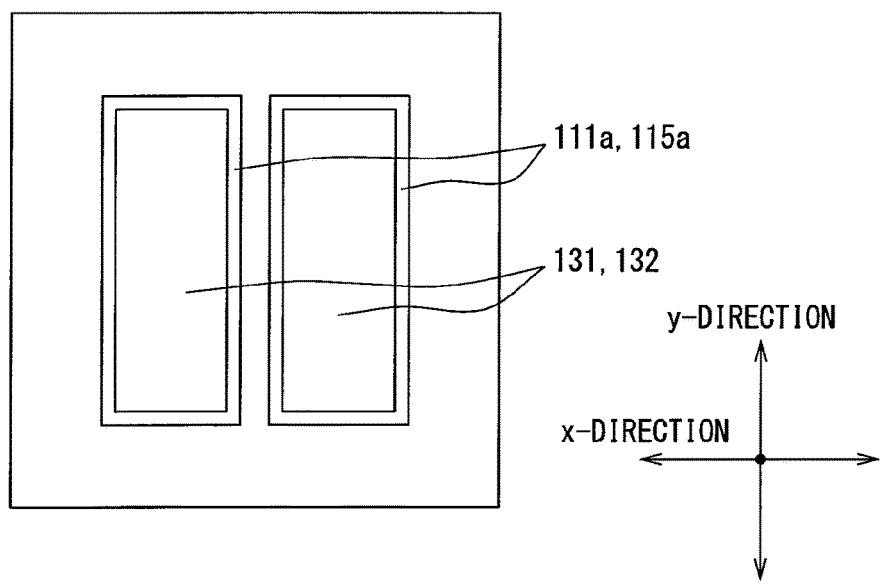
FIG. 10 is a top view illustrating an outline configuration of a first semiconductor layer and a fifth semiconductor illustrated in FIG. 9.

In the following, upper surface shapes of the semiconductor layers 111-115 will be explained individually. As shown in FIG. 10, each semiconductor layer 111, 115 is provided with an annular insulating layer 111a and 115a for electric potential separation. A part of the semiconductor layer 111, 115 surrounded by the insulating layers 111a, 115a corresponds to the above-described fixed detection electrode 131, 132.

Figure 11:
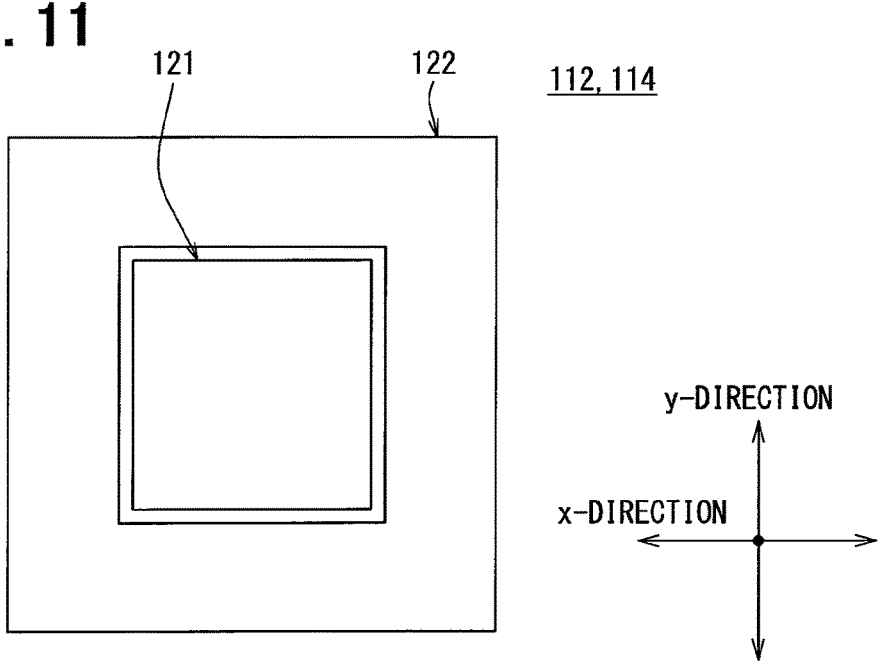
FIG. 11 is a top view illustrating an outline configuration of a second semiconductor layer and a fourth semiconductor layer illustrated in FIG. 9.

As shown in FIG. 11, an annular part between a part of the semiconductor layer 112, 114 constituting the floating part 121 and a part of the semiconductor layer 112, 114 constituting the fixed part 122 is etched in order to mechanically separate the floating part 121 and the fixed part 122.

Figure 12:
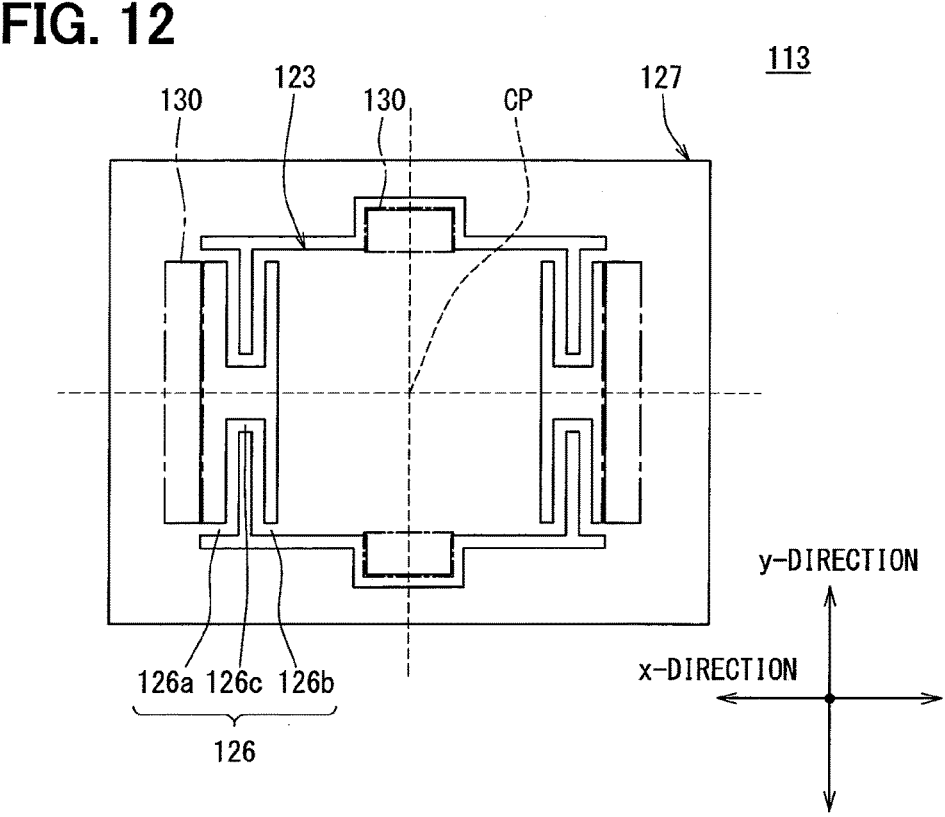
FIG. 12 is a top view illustrating an outline configuration of a third semiconductor layer illustrated in FIG. 9.
Figure 13:
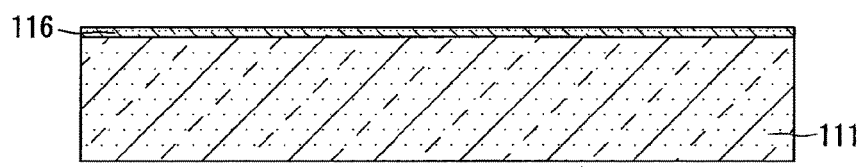
FIG. 13 is a sectional view for explaining a manufacturing process of an acceleration sensor illustrated in FIG. 9.

As shown in FIG. 12, a predetermined shaped part of the third semiconductor layer 113 is etched to form a part of each of the weight 123, the first anchor 127, the detection beam 126, and the first movable damping electrode 130. The first anchor 127 is annular and the weight 123 is rectangular. The first movable damping electrode 130 is also rectangular. The detection beam 126 has a winding shape. Specifically, the detection beam 126 includes two L-shaped portions 126a and 126b each having an L shape on the x-y plane, and an extension portion 126c extending in the x direction and connected to the two L-shaped portions 126a and 126b. Each L-shaped portion 126a, 126b includes a portion extending in the x direction and a portion extending in the y direction. Ends of these two portions are connected to form the L-shape on the x-y plane. One end of the portion, which extends in the x direction, of the first L-shaped portion 126a is connected to the first anchor 127. One end of the portion, which extends in the x direction, of the second L-shaped portion 126b is connected to the weight 123. The portions, each extending in the y direction, of the L-shaped portions 126a, 126b are located side by side in the x direction. Ends of these portions opposite to ends connected to the portions extending in the x direction are connected through the extension portion 126c. Due to the above structure, the detection beam 126 has the winding shape. When the acceleration is applied in the z-direction, the extension portion 126c and the y direction extending portion of each L-shaped portion 126a and 126b are bent to displace the weight 123 (movable electrode 124) in the z-direction. As shown by the dashed line in FIG. 12, the multiple first movable damping electrodes 130 are located line symmetrically and point-symmetrically with respect to a first reference line passing through the center (center CP of the weight 123) of the third semiconductor layer 113 in the x direction and a second reference line passing through the center of the third semiconductor layer 113 in the y direction. Although not shown in FIG. 11 and FIG. 12, each semiconductor layer 112 to 114 is formed with multiple notches for adjusting an etching rate.

Figure 14:
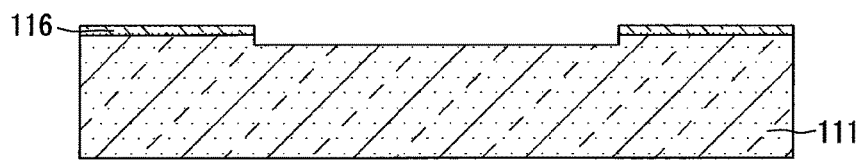
FIG. 14 is a sectional view for explaining a manufacturing process of an acceleration sensor illustrated in FIG. 9.
Figure 15:
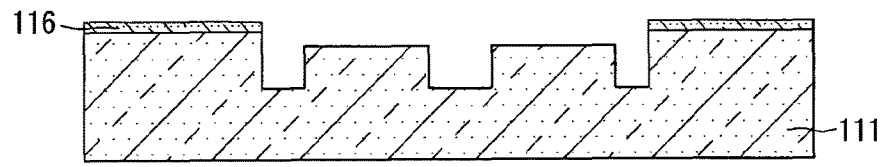
FIG. 15 is a sectional view for explaining a manufacturing process of an acceleration sensor illustrated in FIG. 9.

Next, manufacturing processes of an acceleration sensor 200 will be described based on FIG. 13 to FIG. 22. As shown FIG. 13, a substrate in which a first insulating layer 116 is formed in a first semiconductor layer 111 is prepared first. Next, as shown in FIG. 14, a center portion of each of the first semiconductor layer 111 and the first insulating layer 116 is etched. Then, as shown in FIG. 15, the first semiconductor layer 111 is etched to forming a shape of a first fixed detection electrode 131. In this process, the insulating layer 111a is also formed but illustration of this is omitted. In FIG. 15 to FIG. 22, the illustration of the insulating layer 111a is omitted.

Figure 16:
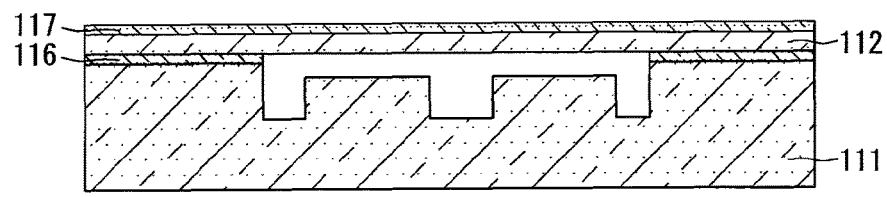
FIG. 16 is a sectional view for explaining a manufacturing process of an acceleration sensor illustrated in FIG. 9.
Figure 17:
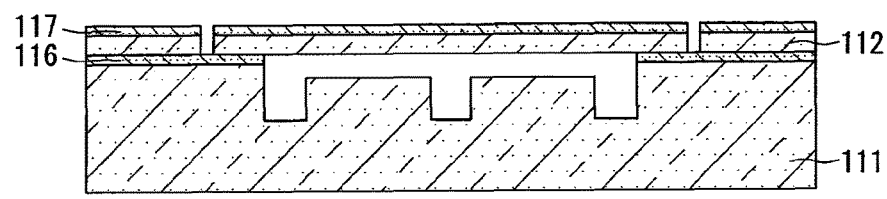
FIG. 17 is a sectional view for explaining a manufacturing process of an acceleration sensor illustrated in FIG. 9.

Thereafter, as shown in FIG. 16, a second semiconductor layer 112 formed with a second insulating layer 117 is layered on the first semiconductor layer 111 through a first insulating layer 116. Then, as shown in FIG. 17, the second semiconductor layer 112 and the second insulating layer 117 are etched for mechanically separating the floating part 121 and the fixed part 122.

Figure 18:
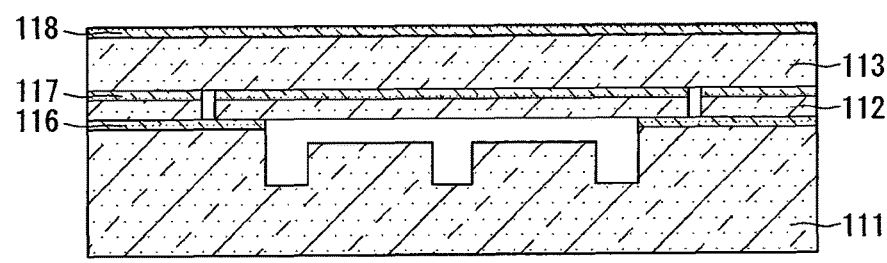
FIG. 18 is a sectional view for explaining a manufacturing process of an acceleration sensor illustrated in FIG. 9.
Figure 19:
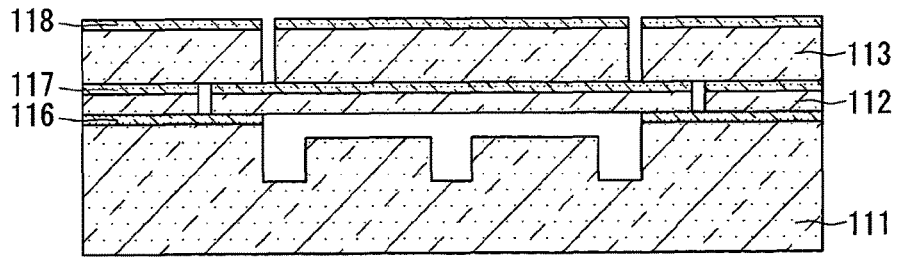
FIG. 19 is a sectional view for explaining a manufacturing process of an acceleration sensor illustrated in FIG. 9.

Next, as shown in FIG. 18, a third semiconductor layer 113 formed with a third insulating layer 118 is layered on the second semiconductor layer 112 through the second insulating layer 117. Then, as shown in FIG. 19, the third semiconductor layer 113 and the third insulating layer 118 are etched to form a shape of each of a weight 123, a first anchor 127, a detection beam 126, and damping electrodes 130, 133.

Figure 20:
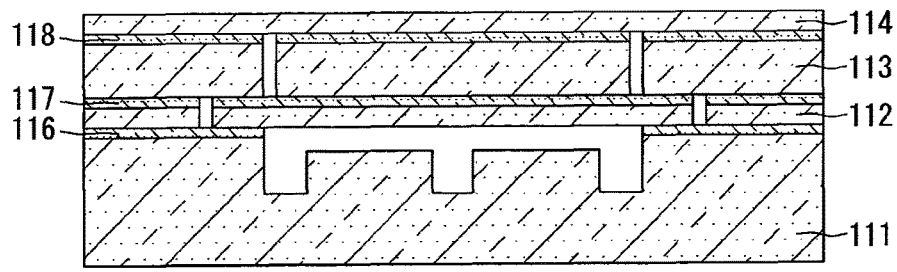
FIG. 20 is a sectional view for explaining a manufacturing process of an acceleration sensor illustrated in FIG. 9.
Figure 21:
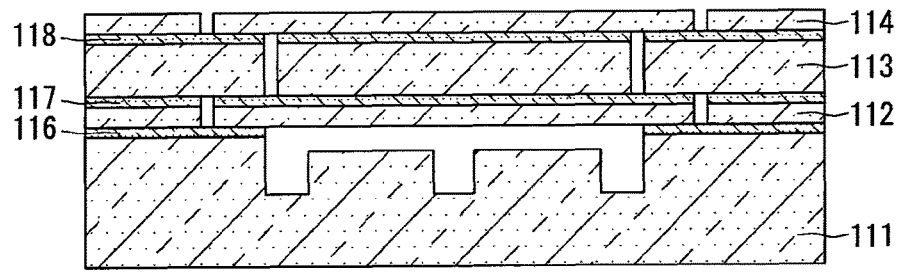
FIG. 21 is a sectional view for explaining a manufacturing process of an acceleration sensor illustrated in FIG. 9.

Thereafter, as shown in FIG. 20, a fourth semiconductor layer 114 is layered on the third semiconductor layer 113 through the third insulating layer 118. Then, as shown in FIG. 21, the fourth semiconductor layer 114 is etched to mechanically separate the floating part 121 and the fixed part 122.

Figure 22:
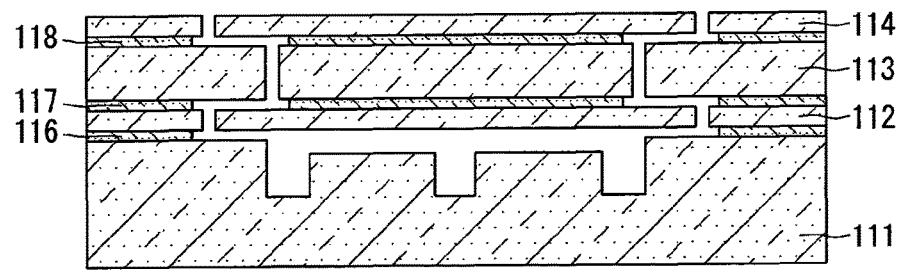
FIG. 22 is a sectional view for explaining a manufacturing process of an acceleration sensor illustrated in FIG. 9.

Next, as shown in FIG. 22, isotropic etching is performed through notches, which were already formed by etching the semiconductor layers 112 to 114 and the insulating layers 116 to 118. This forms the floating part 121 and the fixed part 122. In the substrate, a fourth insulating layer 119 is formed in a fifth semiconductor layer 115 that is etched to have substantially the same shape as in FIG. 15. This substrate is layered through the fourth insulating layer 119 and the fourth semiconductor layer 114. Through the above processes, the acceleration sensor 200 illustrated in FIG. 9 is manufactured.

In the above modifications illustrated with FIG. 9 to FIG. 22, the first movable damping electrodes 130 are formed in the weight 123 so that the first movable damping electrodes 130 are located line-symmetrically with respect to the center CP of the weight 123 and line-symmetrically with respect to the central line CL. The first movable damping electrode 130 is located at a center between two first fixed damping electrodes 133 and is opposed to one of the first fixed damping electrodes 133 in the first z direction and is opposed to the other of the first fixed damping electrodes 133 in the second z direction. Because of this, when the acceleration is applied in the z direction, the damping generated between the first damping electrodes 130, 133 suppresses an excessive displacement of the weight 123 in the z direction. Therefore, even at the time of strong shock such as a rear-end accident, the resultant acceleration is detectable. Moreover, the multiple first movable damping electrodes 130 are located line-symmetrically with respect to the center CP of the weight 123 and line-symmetrically with respect to the central line CL. Because of this, at the time of the strong shock, rotation of the weight 123 on the z-x plane is suppressed and the posture of the weight 123 is controlled. Accordingly, the displacement of the weight 123 in the x direction is suppressed, a change in opposing area between the first detection electrodes 128, 131 and between the second detection electrodes 129, 132 is suppressed. As a result, acceleration detection accuracy reduction is minimized.

The multiple first movable damping electrodes 130 are located line symmetry and point symmetry with respect to a first reference line, which passes through the center CP of the weight 123 in the x direction, and a second reference line, which passes through the center CP of the weight 123 in the x direction. According to this, the rotation of the weight 123 on the z-x plane is suppressed and the posture of the weight 123 is controlled, as compared with a configuration in which multiple first movable damping electrodes 130 are located asymmetrically. Therefore, the displacement of the weight 123 in the x direction is suppressed, and a variation in opposing area between the first detection electrodes 128, 131 and between the second detection electrodes 129, 132 is suppressed. As a result, the reduction in acceleration detection accuracy is suppressed.

Figure 23:
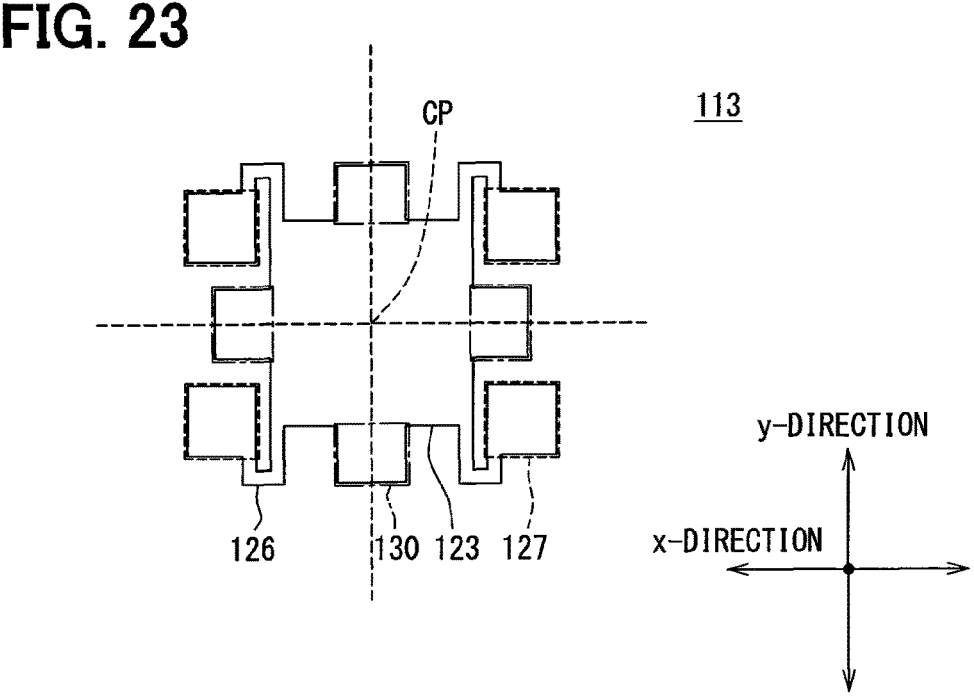
FIG. 23 is a top view illustrating an outline configuration of a third semiconductor layer of one modification.
Figure 24:
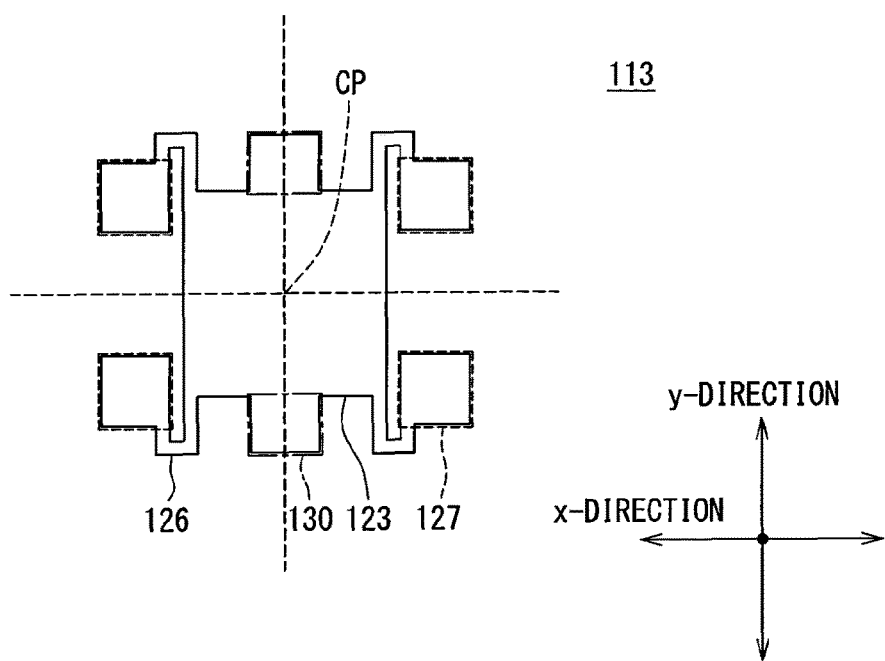
FIG. 24 is a top view illustrating an outline configuration of a third semiconductor layer of another modification.

The modifications illustrated in FIG. 9 to FIG. 22 illustrate examples in which the third semiconductor layer 113 is shaped as shown in FIG. 12. However, the shape of the third semiconductor layer 113 is not limited to the above examples. For example, a shape illustrated in FIG. 23 and FIG. 24 can be employed. The third semiconductor layer 113 illustrated in each of FIG. 23 and FIG. 24 is shaped to have four first anchors 127 and four detection beams 126. In FIG. 23, the first movable damping electrode 130 is formed in each of four sides of the rectangular weight 123. In FIG. 24, the first movable damping electrode 130 is formed in, out of four sides, each of two sides of the rectangular weight 123.

Figure 25:
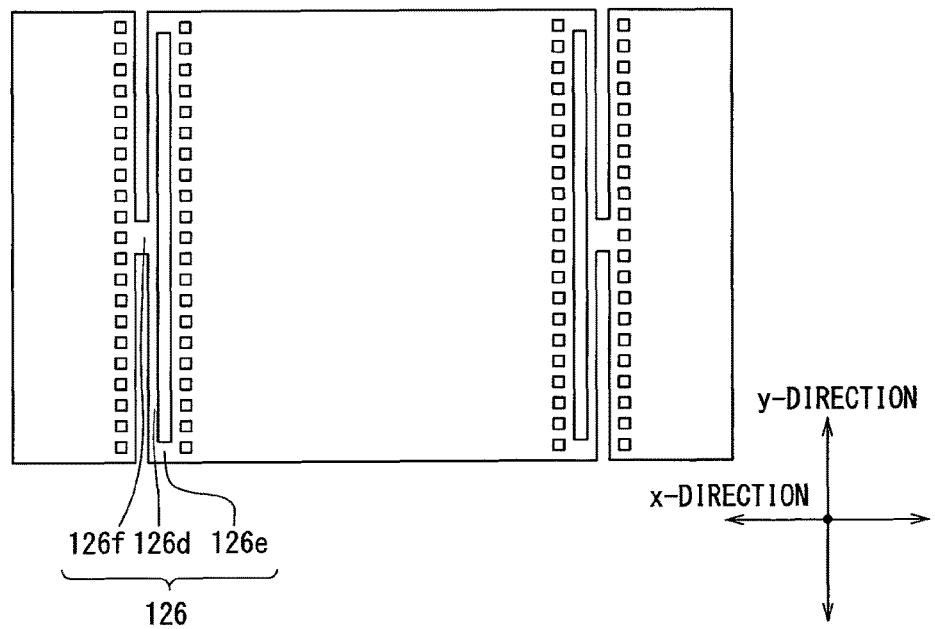
FIG. 25 is a top view illustrating an outline configuration of a second semiconductor layer and a fourth semiconductor layer of a modification.

The above modification illustrates an example in which the detection beam 126 is formed in the third semiconductor layer 113. However, as shown FIG. 25, the detection beams 126 may be formed in the semiconductor layer 112, 114 as an empolyable configuration. The detection beam 126 illustrated in FIG. 25 includes an extension portion 126d extending the y direction, a first connection portion 126e connecting opposite ends of the extension portion 126d to a center portion (part of the first anchor 127) of the semiconductor layers 112, 114, and a second connection portion 126f connecting a center portion of the extension portion 126d to ends of the semiconductor layers 112, 114. In FIG. 25, each semiconductor layer 112, 114 is formed with multiple rectangular notches, which are provided to adjust an etching rate.

Figure 26:
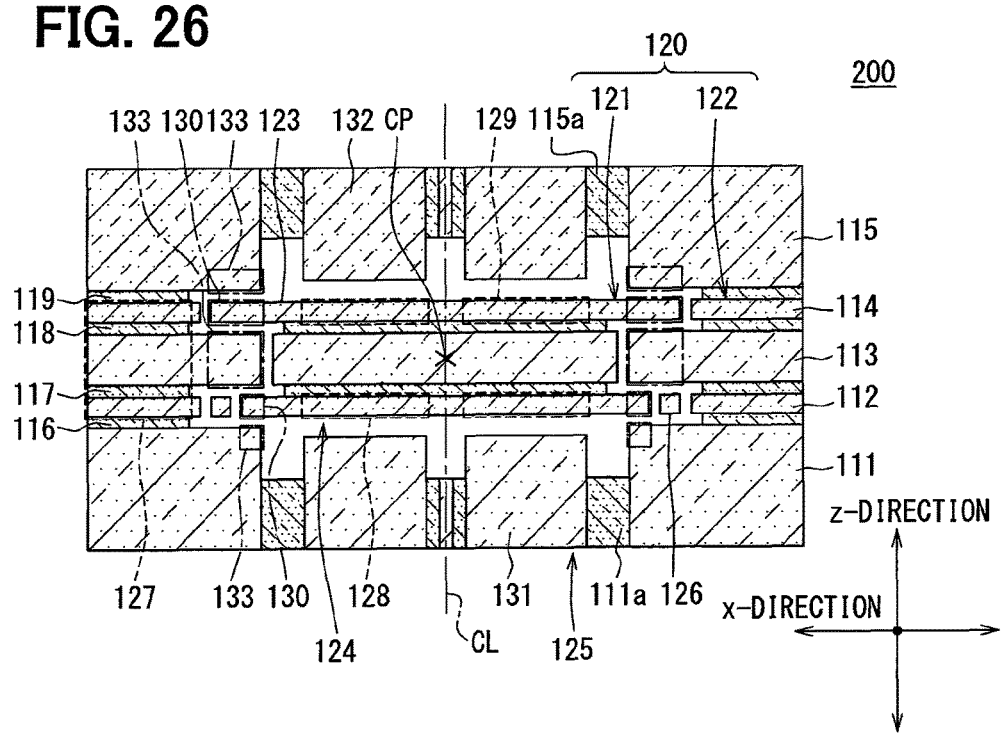
FIG. 26 is a sectional view illustrating one modification of an acceleration sensor illustrated in FIG. 9.

When the second semiconductor layer 112 illustrated in FIG. 25 is adopted, a sectional shape of the acceleration sensor 200 has a shape illustrated in FIG. 26. In this case, the multiple first movable damping electrode 130 are located line symmetry with respect to the central line CL. When the semiconductor layers 112, 114 illustrated in FIG. 25 are adopted, a sectional shape of the acceleration sensor 200 has a shape illustrated in FIG. 27. In this case, the multiple first movable damping electrode 130 are located line point symmetry with respect to the center point CP and also symmetry with respect to the central line CL.

Figure 27:
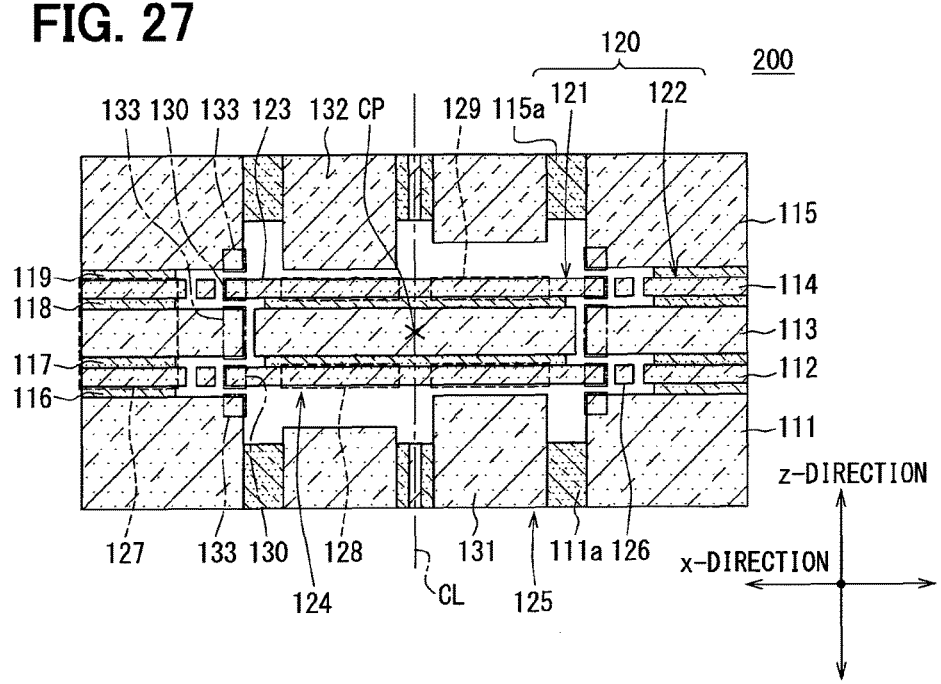
FIG. 27 is a sectional view illustrating another modification of an acceleration sensor illustrated in FIG. 9.
Figure 28:
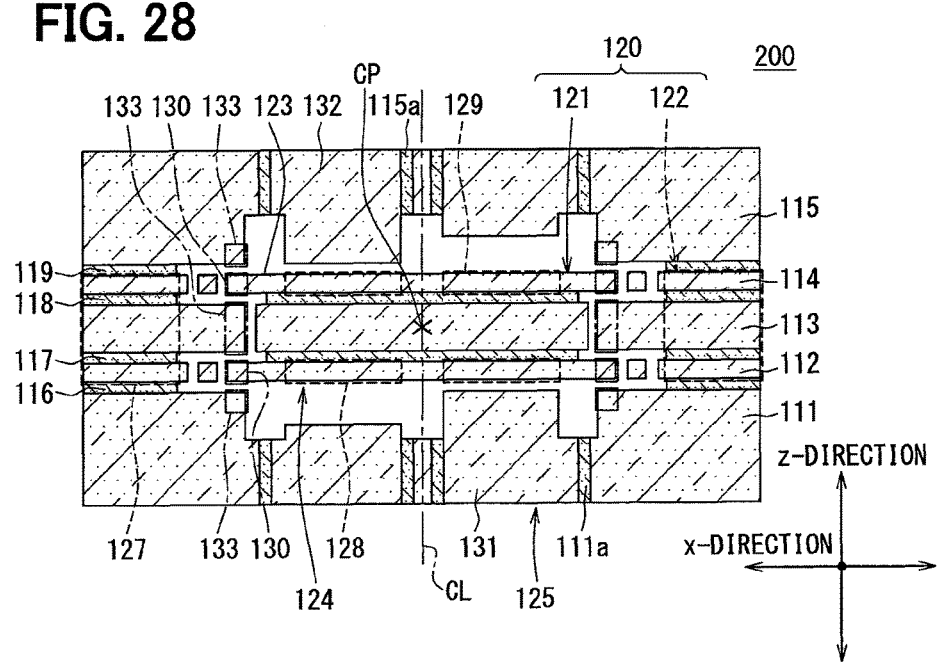
FIG. 28 is a sectional view illustrating a detailed configuration of an acceleration sensor illustrated in FIG. 27.

Although FIG. 27 illustrates an outline configuration of the acceleration sensor 200, a configuration illustrated in FIG. 28 is adopted as a specific configuration of the acceleration sensor 200. Although the shape seems complicated, its description is omitted because a fundamental configuration is substantially the same as that of the acceleration sensor 200 illustrated in FIG. 27.

Figure 29:
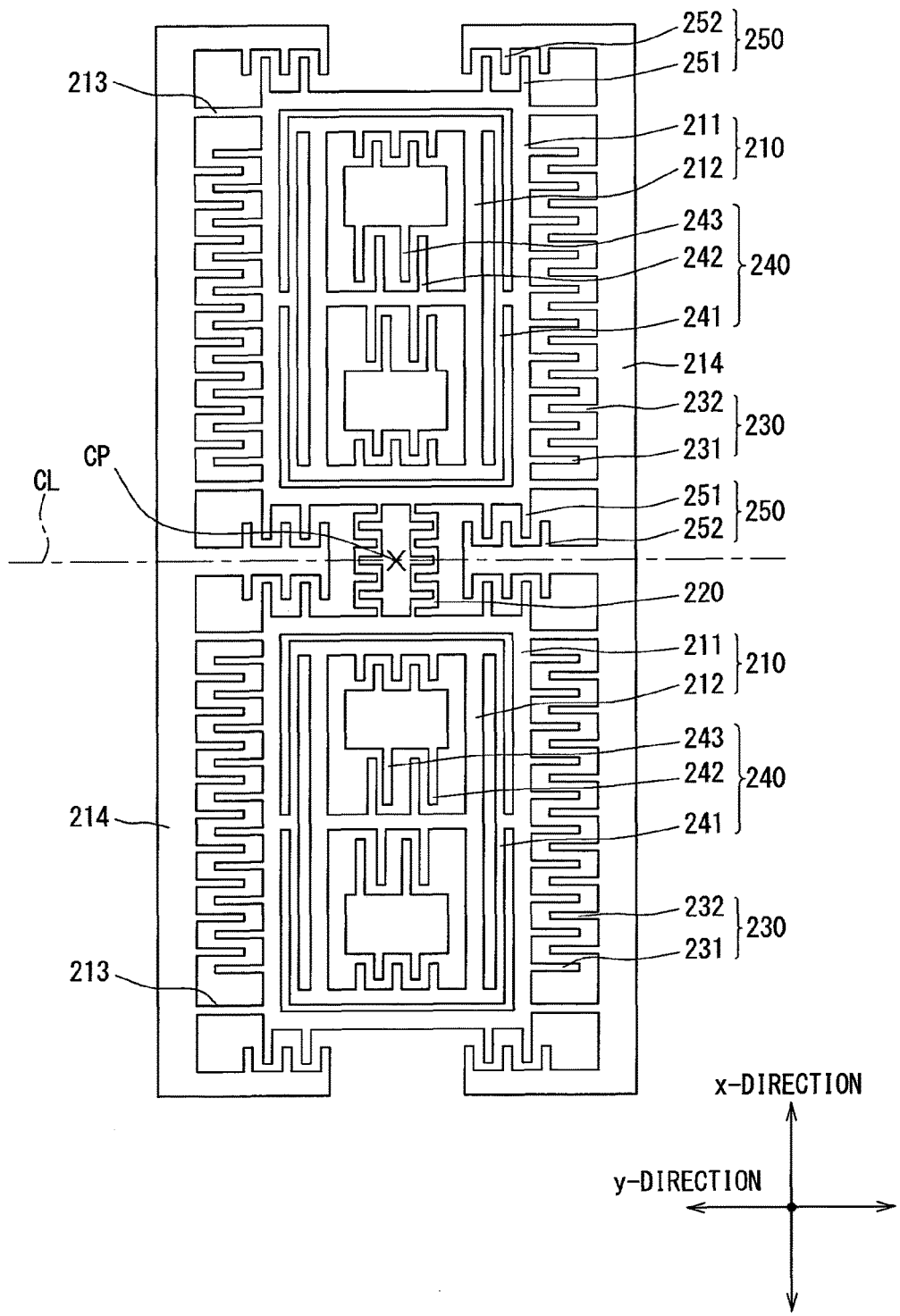
FIG. 29 is a top view illustrating an outline configuration of an angular velocity sensor.

In the present embodiment, the acceleration sensor for detecting acceleration as physical quantity is illustrated as a capacitive physical quantity sensor. However, a configuration of a capacitive physical quantity sensor is not limited to the above example of the acceleration sensor. For example, as shown in FIG. 29, an angular velocity sensor for detecting angular velocity as physical quantity is also employable as a capacitive physical quantity sensor. Hereafter, an angular velocity sensor 300 illustrating in FIG. 29 is will be schematically explained.

The angular velocity sensor 300 illustrated in FIG. 29 includes two vibration parts 210, a coupling beam 220 connecting these two vibration parts 210 to enable coupled-vibration of the two vibration parts 210, an vibration part 230 for oscillating the vibration parts 210 in anti-phase, a detection part 240 for detecting displacements (vibration) of the vibration parts 210 resulting from a Coriolis force generated by application of the angular velocity, and a damping part 250 for maintaining an vibration posture of the vibration parts 210.

The vibration part 210 includes a first frame 211 and a second frame 212. The second frame 212 is provided in a space surrounded by an inner surface of the first frame 211. A fixed beam 213 for fixing an anchor 214 is connected to an outer surface of the first frame 211. The first frame 211 and the second frame 212 are connected through the below-described detection beam 241. The fixed beam 213 has flexibility in the x direction. The detection beam 241 has flexibility in the y direction.

The two vibration parts 210 are located side by side in the x direction, and are mechanically connected through the coupling beam 220. The coupling beam 220 has flexibility in the x direction so that the two vibration parts 210 coupledly vibrate in the x direction in anti-phase.

The vibration part 230 includes a first excitation electrode 231 provided in an x direction-extending outer-surface of the first frame 211 of each of the two vibration parts 210 and a second excitation electrode 232 fixed to the anchor 214. By the electrostatic force generated between these excitation electrodes 231, 232, the two vibration parts 210 coupledly vibrate in the x direction in anti-phase.

The detection part 240 includes a detection beam 241, a movable detection electrode 242, and a fixed detection electrode 243. One end of the detection beam 241 is connected to an inner surface of the first frame 211, and the other end is connected to an outer surface of the second frame 212. The movable detection electrode 242 is fixed to the second frame 212 of the vibration part 210. The fixed detection electrode 243 is opposed to the movable detection electrode 242 in the y direction in order to detect the displacement of the vibration part 210 resulting from a Coriolis force. As described above, the two vibration parts

210 coupledly vibrate in the x direction in anti-phase. Therefore, when an angular velocity is applied in the z-direction, Coriolis forces in opposite directions in the y direction generate in the two vibration parts 210, respectively. Thereby, the detection beams 241 corresponding to the two vibration parts 210 bend in opposite directions in the y direction, and the two vibration parts 210 displace in opposite directions in the y direction. The displacements of these two vibration parts 210 in the opposite directions in the y direction are detected as electrostatic capacities by the above-mentioned detection electrode 242, 243. The displacements of these two vibration parts 210 depend on the angular velocity. The angular velocity is detected based on a difference in electrostatic capacity of the detection capacitors, which respectively correspond to the two vibration parts 210.

The vibration part 210 vibrates in the x direction when angular velocity is not applied, and displaces in the y direction when the angular velocity is applied. The angular velocity depends on a vibration state in the x direction and a displacement amount in the y direction. Therefore, in the case of rotation motion of the vibration parts 210 on the x-y plane, this may reduce detection accuracy in angular velocity. For addressing this, the angular velocity sensor 300 includes the damping part 250 for maintaining the vibration posture of the vibration parts 210, as described above. This damping part 250 includes the first movable damping electrode 251 fixed to the outer surface of the first frame 211 of the vibration part 210, and the first fixed damping electrode 252 opposing the first movable damping electrode 251 in the y direction in order to control the rotation motion of the vibration part 210 on the x-y plane. Each of the damping electrodes 251, 252 is located point symmetry with respect to the center CP of the two vibration parts 210 which constitute a center of mass, and also located line symmetry with respect to the center line CL passing through the center CP in the y direction. The damping electrodes 251, 252 corresponding to one vibration part 210 are located point symmetry with respect to a center of the one vibration part 210 and also located line symmetry with respect a center line passing through the center. Each of the damping electrodes 251, 252 is located at a center of corresponding two first fixed damping electrodes 252, and is opposed to one of the first fixed damping electrodes 252 in the first y direction, and is opposed to the other of the first fixed damping electrodes 252 in the second y direction. Because of this configuration, even when the vibration part 210 attempts to rotate on the x-y plane, the rotation motion is suppressed by damping between the damping electrodes 251, 252.

In the present disclosure, a capacitive physical quantity sensor is provided in various forms. For example, a capacitive physical quantity sensor of one example of the present disclosure comprises a substrate having one surface along a x-y plane, which is defined by a x direction and a y direction perpendicular to each other, an anchor fixed to the one surface of the substrate, a detection beam connected to the substrate through the anchor, a weight connected to the detection beam, a movable electrode formed in the weight, and a fixed electrode opposed to the movable electrode on the x-y plane. The detection beam has flexibility in the y direction. The movable electrode includes a first movable detection electrode, a second movable detection electrode and a first movable damping electrode. The fixed electrode includes a first fixed detection electrode, a second fixed detection electrode and a first fixed damping electrode. The first fixed detection electrode is located separately from the first movable detection electrode in a first y direction and is opposed to the first movable detection electrode in the first y direction, the first y direction being one direction in the y direction. The second fixed detection electrode is located separately from the second movable detection electrode in a second y direction and is opposed to the second movable detection electrode in the second y direction, the second y direction and the first y direction are opposite directions. The first movable damping electrode is located at a center between corresponding two of the first fixed damping electrodes and is opposed to one of the corresponding two of the first fixed damping electrodes in the first y direction and is opposed to the other of the corresponding two of the first fixed damping electrodes in the second y direction. A plurality of the first movable damping electrodes are located point-symmetrically with respect to the center of the weight, or line-symmetrically with respect to a center line, which passes through the center of the weight in the y direction.

According to this capacitive physical quantity sensor, when an acceleration is applied in the y-direction, an excessive displacement of the weight in the y-direction is suppressed by damping between the first movable damping electrode and the first fixed damping electrode. Therefore, even at a time of strong shock application such as a rear-end collision etc., a resultant physical quantity such as acceleration or the like is detectable. Moreover, in the above capacitive physical quantity sensor, the plurality of the first movable damping electrodes are located point-symmetrically with respect to the center of the weight, or line-symmetrically with respect to a center line, which passes through the center of the weight in the y direction. Thus, at the time of strong shock, rotation of the weight on the x-y plane is suppressed, and the posture of the weight is controlled. This suppresses displacement of the weight in the x direction and suppresses a change in opposing surface between the detection electrodes. As a result, reduction in acceleration detection accuracy is suppressed. It is noted that in the present disclosure, recitation of the point-symmetry or point-symmetry includes the point-symmetry and point-symmetry and does not exclude satisfaction of both.

In the capacitive physical quantity sensor, the weight may have a frame shape in which ends of two first stick portions extending along the y direction are connected to ends of two second stick portions extending along the x direction, and the first movable damping electrodes may be formed in the first stick portions. The movable electrode may include a second movable damping electrode. The fixed electrode may include a second fixed damping electrode. The second movable damping electrode may be formed in the second stick portions. The second movable damping electrode may be located at a center between two of the second fixed damping electrodes and may be opposed to one of the two of the second fixed damping electrodes in a first x direction being one direction in the x direction and may be opposed to the other of the two of the second fixed damping electrodes in a second x direction opposite to the first x direction. A plurality of the second movable damping electrodes may be located point-symmetrically with respect to the center of the weight, or line-symmetrically with respect to the center line, which passes through the center of the weight in the y direction. According to this configuration, damping generated between the second movable dumping electrode and the second fixed dumping electrode further suppresses the rotation of the weight on the x-y plane more effectively, and controls the posture of the weight more effectively. As a result, reduction in acceleration detection accuracy is suppressed more effectively.

The first movable damping electrodes may have a geometrically similar relation with the first fixed damping electrodes. The first movable damping electrodes and the first fixed damping electrodes may have a constant interval therebetween.

According to this configuration, it becomes difficult to generate imbalance of damping between the first movable dumping electrode and the first fixed dumping electrode, as compared with a configuration in which the first movable damping electrodes and the first fixed damping electrodes are not geometrically similar and an opposing interval between the first movable damping electrodes and the first fixed damping electrodes are not constant. Therefore, as compared with the above comparative configuration, the rotation of the weight is suppressed and the posture of the weight is controlled. As a result, reduction in acceleration detection accuracy is suppressed.

The capacitive physical quantity sensor may be configured as follows. A first fixed detection pad for taking out a capacitance formed between the first movable detection electrode and the first fixed detection electrode is formed in the first fixed detection electrode. A second fixed detection pad for taking out a capacitance formed between the second movable detection electrode and the second fixed detection electrode is formed in the second fixed detection electrode. A movable detection pad for applying a constant voltage is formed in the weight. A damping pad for applying a diagnostic voltage different in polarity from the voltage applied to the first movable detection pad is formed in the first fixed damping electrode. The voltages having different polarities are applied to the first fixed detection pad and the second fixed detection pad for a predetermined time period, respectively. Immediately after application of the voltages, the diagnostic voltage is applied to the damping pad and the capacitance of the first detection capacitor at a time of the voltage application is taken out from the first fixed detection pad and the capacitance of the second detection capacitor is taken out from the second fixed detection pad.

According to this configuration, at a time of self-diagnosis, the diagnosis voltage is applied to the damping pad to determine a presence and absence of failure of the capacitive physical quantity sensor. In this way, by using the damping pad, it becomes possible to perform the self-diagnosis of failure of the capacitive physical quantity sensor.

A capacitive physical quantity sensor of another example of the present disclosure comprises a substrate having one surface along a x-y plane defined by a x direction and a y direction perpendicular to each other, an anchor fixed to the one surface of the substrate, a detection beam connected to the substrate through the anchor, a weight connected to the detection beam, a movable electrode formed in the weight, and a fixed electrode opposed to the movable electrode in a z-direction, which is perpendicular to the x-y plane. The detection beam has flexibility in the z-direction. The movable electrode includes a first movable detection electrode, a second movable detection electrode and a first movable damping electrode. The fixed electrode includes a first fixed detection electrode, a second fixed detection electrode and a first fixed damping electrode. The first fixed detection electrode is located apart from the first movable detection electrode in a first z-direction being one direction in the z-direction and is opposed to the first movable detection electrode in the first z-direction. The second fixed detection electrode is located apart from the second movable detection electrode in a second z-direction being opposite to the first z-direction and is opposed to the second movable detection electrode in the second z-direction. Each of a plurality of the first movable damping electrodes is located at a center between corresponding two of the first fixed damping electrodes, is opposed to one of the corresponding two of the first fixed damping electrodes in the first z direction, and is opposed to the other of the corresponding two of the first fixed damping electrodes in the second z direction. The plurality of the first movable damping electrodes are located point-symmetrically with respect to a center of the weight, or line-symmetrically with respect to a center line, which pass through the center of the weight in the z-direction.

According to this capacitive physical quantity sensor, when acceleration is applied in the z-direction, an excessive displacement of the weight in the y-direction is suppressed by damping between the first damping electrodes. Therefore, even at the time of strong shock such as a rear-end accident, the resultant acceleration is detectable. Moreover, the plurality of the first movable damping electrodes are located point-symmetrically with respect to the center of the weight, or line-symmetrically with respect to the center line. Thus, at the time of strong shock, rotation of the weight on the z-x plane is suppressed, and the posture of the weight is controlled and a change in opposing surface between the detection electrodes is suppressed. As a result, reduction in acceleration detection accuracy is suppressed.

Although embodiments and configurations of the present disclosure have been illustrated, embodiments and configurations of the present disclosure are not limited to the above-illustrated ones. For example, the scope of the embodiments, the configurations, and the modes of the disclosure also covers embodiments and configurations resulting from appropriately combining the disclosed technical aspects with different embodiments and configurations.

The invention claimed is:
1. A capacitive physical quantity sensor comprising:
   a substrate having one surface along a x-y plane, which is defined by a x direction and a y direction perpendicular to each other;
   two anchors fixed to the one surface of the substrate;
   two detection beams, respectively connected to the substrate through the two anchors;
   a weight shaped to extend in the y direction and having a first end portion, a center portion and a second end portion, wherein the first end portion of the weight and the second end portion of the weight, respectively, are connected to the two anchors through the two detection beams;
   a movable electrode formed in the weight; and
   a fixed electrode opposed to the movable electrode on the x-y plane,
   wherein
   the detection beams have flexibility in the y direction;
      the movable electrode includes a plurality of first movable detection electrodes, a plurality of second movable detection electrodes and a plurality of first movable damping electrodes;
      the fixed electrode includes a plurality of first fixed detection electrodes connected to a first fixed detection pad, a plurality of second fixed detection electrodes connected to a second fixed detection pad and a plurality of first fixed damping electrodes connected to a damping pad;
      the first fixed detection electrodes are located separately from the first movable detection electrodes in a first y direction and are opposed to the first movable detection electrodes in the first y direction, the first y direction being one direction in the y direction;

the second fixed detection electrodes are located separately from the second movable detection electrodes in a second y direction and are opposed to the second movable detection electrodes in the second y direction, the second y direction and the first y direction are opposite directions;

each of the first movable damping electrodes extends from the weight in the x direction and is located at a center between corresponding two of the first fixed damping electrodes and is opposed to one of the corresponding two of the first fixed damping electrodes in the first y direction and is opposed to the other of the corresponding two of the first fixed damping electrodes in the second y direction;

the first movable detection electrodes and the second movable detection electrodes are located at side surfaces of the center portion of the weight;

the first movable damping electrodes are located at a side surface of each of the first end portion of the weight and the second end portion of the weight, so that the first movable damping electrodes are located point-symmetrically with respect to the center of the weight and line-symmetrically with respect to a center line, which passes through the center of the weight in the y direction.

2. The capacitive physical quantity sensor according to claim 1, wherein:

the first movable damping electrodes have a geometrically similar relation with the first fixed damping electrodes; and the first movable damping electrodes and the first fixed damping electrodes have a constant interval therebetween.

3. The capacitive physical quantity sensor according to claim 1, wherein:

the first fixed detection pad is for taking out a capacitance and is formed between the first movable detection electrode and the first fixed detection electrode is formed in the first fixed detection electrode;

the second fixed detection pad is for taking out a capacitance and formed between the second movable detection electrode and the second fixed detection electrode is formed in the second fixed detection electrode;

a movable detection pad for applying a constant voltage is formed in the weight;

the damping pad is for applying a diagnostic voltage different in polarity from the voltage applied to a first movable detection pad and is formed in the first fixed damping electrode;

the voltages having different polarities are applied to the first fixed detection pad and the second fixed detection pad for a predetermined time period, respectively; and immediately after application of the voltages, the diagnostic voltage is applied to the damping pad and the capacitance of the first detection capacitor at a time of the voltage application is taken out from the first fixed detection pad and the capacitance of the second detection capacitor is taken out from the second fixed detection pad.

4. The capacitive physical quantity sensor according to claim 1, wherein the first movable damping electrodes and the first fixed damping electrodes are configured to generate therebetween damping to suppress rotation of the weight on the x-y plane.

5. A capacitive physical quantity sensor comprising:
a substrate having one surface along a x-y plane, which is defined by a x direction and a y direction perpendicular to each other;
an anchor fixed to the one surface of the substrate;
a detection beam connected to the substrate through the anchor;
a weight connected to the detection beam;
a movable electrode formed in the weight; and
a fixed electrode opposed to the movable electrode on the x-y plane,
wherein:
the detection beam has flexibility in the y direction;
the movable electrode includes a plurality of first movable detection electrodes, a plurality of second movable detection electrodes and a plurality of first movable damping electrodes;
the fixed electrode includes a plurality of first fixed detection electrodes connected to a first fixed detection pad, a plurality of second fixed detection electrodes connected to a second fixed detection pad and a plurality of first fixed damping electrodes connected to a damping pad;
the first fixed detection electrodes are located separately from the first movable detection electrodes in a first y direction and are opposed to the first movable detection electrodes in the first y direction, the first y direction being one direction in the y direction;
the second fixed detection electrodes are located separately from the second movable detection electrodes in a second y direction and are opposed to the second movable detection electrodes in the second y direction, the second y direction and the first y direction are opposite directions;
each of the first movable damping electrodes extends from the weight in the x direction and is located at a center between corresponding two of the first fixed damping electrodes and is opposed one of the corresponding two of the first fixed damping electrodes in the first y direction and is opposed to the other of the corresponding two of the first fixed damping electrodes in the second y direction;
the weight has a frame shape in which ends of two first stick portions extending along the y direction are connected to ends of two second stick portions extending along the x direction;
the first movable detection electrodes and the second movable detection electrodes are located at inner side surfaces of the first stick portions of the weight; and
the first movable damping electrodes are located at an outer side surface of each of the first stick portions of the weight so that the first movable damping electrodes are located point-symmetrically with respect to the center of the weight and line-symmetrically with respect to a center line, which passes through the center of the weight in the y direction.

6. The capacitive physical quantity sensor according to claim 5, wherein the first movable damping electrodes and the first fixed damping electrodes are configured to generate therebetween damping to suppress rotation of the weight on the x-y plane.

7. A capacitive physical quantity sensor comprising:
a substrate having one surface along a x-y plane, which is defined by a x direction and a y direction perpendicular to each other;
an anchor fixed to the one surface of the substrate;
a detection beam connected to the substrate through the anchor;

a weight connected to the detection beam;
a movable electrode formed in the weight; and
a fixed electrode opposed to the movable electrode on the x-y plane,
wherein:
the detection beam has flexibility in the y direction;
the movable electrode includes a plurality of first movable detection electrodes, a plurality of second movable detection electrodes and a plurality of first movable damping electrodes;
the fixed electrode includes a plurality of first fixed detection electrodes, a plurality of second fixed detection electrodes and a plurality of first fixed damping electrodes;
the first fixed detection electrodes are located separately from the first movable detection electrodes in a first y direction and are opposed to the first movable detection electrodes in the first y direction, the first y direction being one direction in the y direction;
the second fixed detection electrodes are located separately from the second movable detection electrodes in a second y direction and are opposed to the second movable detection electrodes in the second y direction, the second y direction and the first y direction are opposite directions;
each of the first movable damping electrodes extends from the weight in the x direction and is located at a center between corresponding two of the first fixed damping electrodes and is opposed one of the corresponding two of the first fixed damping electrodes in the first y direction and is opposed to the other of the corresponding two of the first fixed damping electrodes in the second y direction;
the weight has a frame shape in which ends of two first stick portions extending along the y direction are connected to ends of two second stick portions extending along the x direction;
the first movable detection electrodes and the second movable detection electrodes are located at inner side surfaces of the first stick portions of the weight;
the first movable damping electrodes are located at an outer side surface of each of the two first stick portions of the weight so that the first movable damping electrodes are located point-symmetrically with respect to the center of the weight and line-symmetrically with respect to a center line, which passes through the center of the weight in the y direction;
the movable electrode further includes a plurality of second movable damping electrodes;
the fixed electrode further includes a plurality of second fixed damping electrodes;
the second movable damping electrodes are located at each of the two second stick portions;
each of the second movable damping electrodes is located at a center between two of the second fixed damping electrodes and is opposed to one of the two of the second fixed damping electrodes in a first x direction being one direction in the x direction and is opposed to the other of the two of the second fixed damping electrodes in a second x direction opposite to the first x direction; and
the second movable damping electrodes are located point-symmetrically with respect to the center of the weight.

8. The capacitive physical quantity sensor according to claim 7, wherein the first movable damping electrodes and the first fixed damping electrodes are configured to generate therebetween damping to suppress rotation of the weight on the x-y plane.

9. A capacitive physical quantity sensor comprising:
a substrate having one surface along a x-y plane defined by a x direction and a y direction perpendicular to each other;
an anchor fixed to the one surface of the substrate;
a detection beam connected to the substrate through the anchor;
a weight connected to the detection beam;
a movable electrode formed in the weight; and
a fixed electrode opposed to the movable electrode in a z-direction, which is perpendicular to the x-y plane,
wherein:
the detection beam has flexibility in the z-direction;
the movable electrode includes a first movable detection electrode, a second movable detection electrode and a first movable damping electrode;
the fixed electrode includes a first fixed detection electrode, a second fixed detection electrode and a first fixed damping electrode;
the first fixed detection electrode is located apart from the first movable detection electrode in a first z-direction being one direction in the z-direction and is opposed to the first movable detection electrode in the first z-direction;
the second fixed detection electrode is located apart from the second movable detection electrode in a second z-direction being opposite to the first z-direction and is opposed to the second movable detection electrode in the second z-direction;
each of a plurality of the first movable damping electrodes is located at a center between corresponding two of the first fixed damping electrodes, is opposed to one of the corresponding two of the first fixed damping electrodes in the first z direction, and is opposed to the other of the corresponding two of the first fixed damping electrodes in the second z direction;
the plurality of the first movable damping electrodes are located point-symmetrically with respect to a center of the weight, or line-symmetrically with respect to a center line, which pass through the center of the weight in the z-direction; and
the first movable detection electrode and the second movable detection electrode are located closer to the center of the weight than the first fixed damping electrodes are.

10. A capacitive physical quantity sensor comprising:
a substrate having one surface along a x-y plane, which is defined by a x direction and a y direction perpendicular to each other;
an anchor fixed to the one surface of the substrate;
a detection beam connected to the substrate through the anchor;
a weight connected to the detection beam;
a movable electrode formed in the weight; and
a fixed electrode opposed to the movable electrode on the x-y plane,
wherein:
the detection beam has flexibility in the y direction;
the movable electrode includes a plurality of first movable detection electrodes, a plurality of second movable detection electrodes and a plurality of first movable damping electrodes;

the fixed electrode includes a plurality of first fixed detection electrodes, a plurality of second fixed detection electrodes and a plurality of first fixed damping electrodes;

the first fixed detection electrodes are located separately from the first movable detection electrode in a first y direction and are opposed to the first movable detection electrode in the first y direction, the first y direction being one direction in the y direction;

the second fixed detection electrodes are located separately from the second movable detection electrode in a second y direction and are opposed to the second movable detection electrode in the second y direction, the second y direction and the first y direction are opposite directions;

each of the first movable damping electrodes extends from the weight in the x direction and is located at a center between corresponding two of the first fixed damping electrodes and is opposed to one of the corresponding two of the first fixed damping electrodes in the first y direction and is opposed to the other of the corresponding two of the first fixed damping electrodes in the second y direction;

the weight has a frame shape in which ends of two first stick portions extending along the y direction are connected to ends of two second stick portions extending along the x direction;

the first movable detection electrodes and the second movable detection electrodes are located at inner side surfaces of the first stick portions of the weight;

the first movable damping electrodes are located at an inner side surface of each of the two first stick portions so that the first movable damping electrodes are located point-symmetrically with respect to the center of the weight and line-symmetrically with respect to a center line, which passes through the center of the weight in the y direction;

the first movable detection electrodes are located at an inner side surface of a center portion of one first stick portion out of the two first stick portions;

the second movable detection electrodes are located at an inner side surface of a center portion of the other first stick portion out of the two first stick portions;

the first movable damping electrodes are located at end portions of each of the two first stick portions; and the first movable detection electrodes and the second movable detection electrodes are located closer to the center of the weight than the first damping electrodes are.

11. The capacitive physical quantity sensor according to claim 10, wherein the first movable damping electrodes and the first fixed damping electrodes are configured to generate therebetween damping to suppress rotation of the weight on the x-y plane.

* * * * *